(12) United States Patent
Tsukagoshi

(10) Patent No.: US 10,979,664 B2
(45) Date of Patent: Apr. 13, 2021

(54) TRANSMISSION DEVICE, TRANSMISSION METHOD, RECEPTION DEVICE AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/077,616

(22) PCT Filed: Mar. 8, 2017

(86) PCT No.: PCT/JP2017/009182
§ 371 (c)(1),
(2) Date: Aug. 13, 2018

(87) PCT Pub. No.: WO2017/159482
PCT Pub. Date: Sep. 21, 2017

(65) Prior Publication Data
US 2019/0037168 A1    Jan. 31, 2019

(30) Foreign Application Priority Data

Mar. 15, 2016    (JP) .............................. JP2016-051657

(51) Int. Cl.
*H04N 21/235*    (2011.01)
*H04N 21/431*    (2011.01)
(Continued)

(52) U.S. Cl.
CPC ......... *H04N 7/0885* (2013.01); *H04N 5/2628* (2013.01); *H04N 5/278* (2013.01);
(Continued)

(58) Field of Classification Search
CPC ............... H04N 21/235; H04N 21/431; H04N 21/440272; H04N 21/4884; H04N 7/0885;
(Continued)

(56) References Cited

U.S. PATENT DOCUMENTS

| 2002/0019989 A1* | 2/2002 | Enomoto | H04N 21/4312 725/139 |
| 2005/0008347 A1* | 1/2005 | Jung | H04N 21/4325 386/230 |

(Continued)

FOREIGN PATENT DOCUMENTS

| JP | 2012-169885 A | 9/2012 |
| JP | 2014-64308 A | 4/2014 |

(Continued)

OTHER PUBLICATIONS

Extended European Search Report dated Jun. 14, 2019 in Patent Application No. 17766483.6, 9 pages.

(Continued)

*Primary Examiner* — Randy A Flynn
(74) *Attorney, Agent, or Firm* — Oblon, McClelland, Maier & Neustadt, L.L.P.

(57) ABSTRACT

It becomes possible to satisfactorily perform subtitle display in the reception side.
A container of a predetermined format is transmitted, the container including a video stream including video data and a subtitle stream including text information of a subtitle, the text information including subtitle display position information for specifying a subtitle display position as a relative position with respect to a subtitle display range. Auxiliary information is inserted, into a container of the subtitle stream, to be used when the subtitles is displayed by using subtitle position information. For example, the auxiliary
(Continued)

information is information regarding resizing processing, information for determining a subtitle display range, and the like.

17 Claims, 37 Drawing Sheets

(51) Int. Cl.
    *H04N 21/4402*      (2011.01)
    *H04N 21/488*      (2011.01)
    *H04N 7/088*      (2006.01)
    *H04N 7/025*      (2006.01)
    *H04N 5/262*      (2006.01)
    *H04N 5/278*      (2006.01)
    *H04N 5/445*      (2011.01)

(52) U.S. Cl.
    CPC ......... *H04N 5/44504* (2013.01); *H04N 7/025* (2013.01); *H04N 21/235* (2013.01); *H04N 21/431* (2013.01); *H04N 21/440272* (2013.01); *H04N 21/4884* (2013.01)

(58) Field of Classification Search
    CPC ...... H04N 7/025; H04N 5/2628; H04N 5/278; H04N 5/44504
    See application file for complete search history.

(56) References Cited

U.S. PATENT DOCUMENTS

| | | | | |
|---|---|---|---|---|
| 2005/0078947 A1* | 4/2005 | Chung | ............... | H04N 21/4884 386/241 |
| 2005/0207442 A1* | 9/2005 | Zoest | ................... | H04N 21/845 370/465 |
| 2006/0168639 A1* | 7/2006 | Gan | ................... | H04N 21/4348 725/135 |
| 2007/0113245 A1* | 5/2007 | Tan | ................... | H04N 21/4435 725/38 |
| 2009/0027552 A1* | 1/2009 | Yang | ................... | H04N 21/4314 348/465 |
| 2009/0138934 A1* | 5/2009 | Aoki | ................... | H04N 21/4882 725/131 |
| 2010/0321393 A1* | 12/2010 | Levantovsky | ..... | H04N 21/8146 345/467 |
| 2011/0090312 A1* | 4/2011 | Uchimura | ........ | H04N 21/42646 348/43 |
| 2011/0119709 A1* | 5/2011 | Kim | ................... | H04N 21/4884 725/39 |
| 2011/0242104 A1* | 10/2011 | Zhang | ................... | H04N 13/183 345/419 |
| 2011/0285726 A1* | 11/2011 | Redmann | ............. | H04N 9/3102 345/467 |
| 2012/0170906 A1* | 7/2012 | Soroushian | ........ | H04N 21/6587 386/241 |
| 2015/0124888 A1* | 5/2015 | Hwang | .......... | H04N 21/234372 375/240.25 |

FOREIGN PATENT DOCUMENTS

| | | |
|---|---|---|
| JP | 2016-28472 A | 2/2016 |
| WO | WO 2007/052736 A1 | 5/2007 |

OTHER PUBLICATIONS

International Search Report dated Jun. 13, 2017 in PCT/JP2017/009182 filed Mar. 8, 2017.
Partial Supplementary European Search Report dated Mar. 14, 2019 in Patent Application No. 17766483.6, citing documents AX and AY therein, 11 pages.
Tsukagoshi, I. et al. "Sony Proposal to root container region" Digital Video Broadcast (DVB), XP01780429, 2015, 9 pages.
Cherriman, P. "Subtitle Editorial Area (SEA) proposal" Digital Video Broadcast (DVB), XP017850446, 2015, 15 pages.

\* cited by examiner

FIG. 2
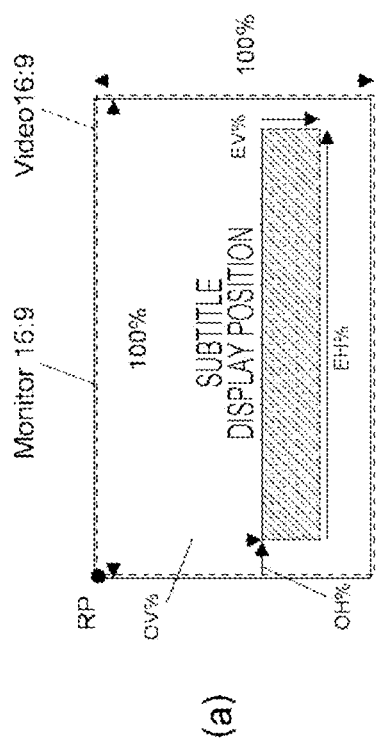
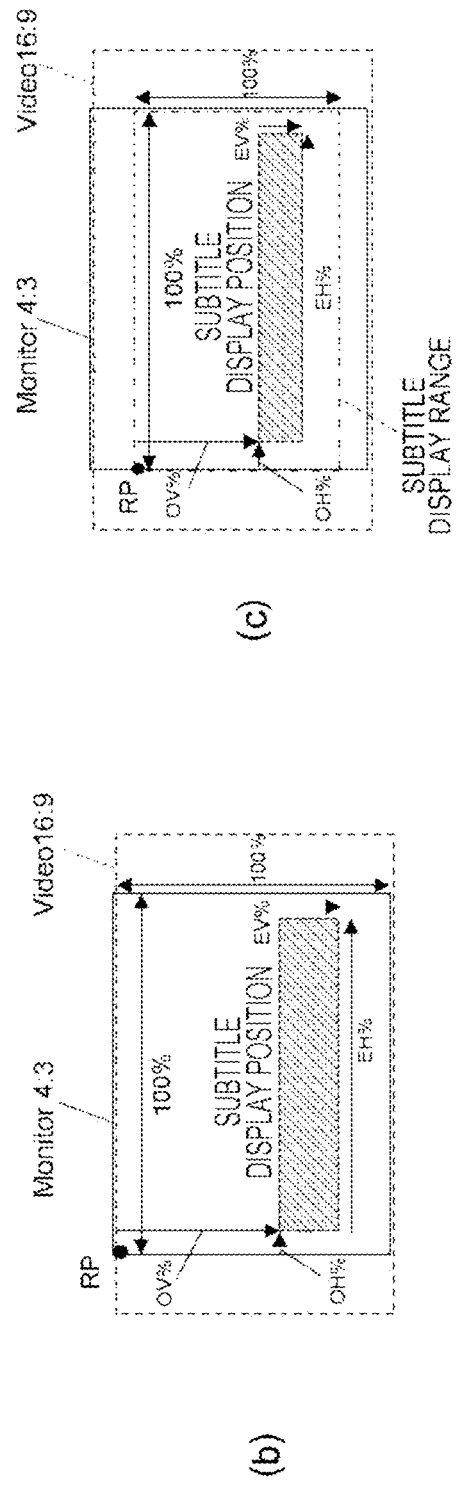

*FIG. 3*

```
<tt xml:lang=" " xmlns="http://www.w3.org/ns/ttml"
  tts:extent=fullvideo
  xmlns:ttp="http://www.w3.org/ns/ttml#parameter"
  xmlns:tts="http://www.w3.org/ns/ttml#styling"
  xmlns:dto="http://www.example.org/ns/displaytextoverlay"
  dto:dispasp="16:9"
  dto:RPoffset="Ax%, By%">
  <head>
    <layout>
      <region xml:id="r1" tts:origin="OH% OV%" tts:extent="EH% EV%"/>
    </layout>
    <style tts:fontFamily=" proportionalSansSerif" />
  </head>
  <body>
    <div>
      <p xml:id="p1" region=" r1" tts:font-family:'Arial', 'Tahoma', sans-serif
        dto:scalingjustify=top>
        ABCDE
      </p>
    </div>
  </body>
</tt>
```

FIG. 4

```
dto:dispasp
    "4:3"           : SUBTITLE DISPLAY RANGE IS AREA OF ASPECT RATIO OF 4:3
    "16:9"          : SUBTITLE DISPLAY RANGE IS AREA OF ASPECT RATIO OF 16:9
    "21:9"          : SUBTITLE DISPLAY RANGE IS AREA OF ASPECT RATIO OF 21:9 dto:RPoffset="Ax%, By%"
    Ax, By          POSITION OF RP OF WHEN EACH OF VERTICAL AND HORIZONTAL RANGES OF
                    DISPLAY VIDEO AREA IS SET TO 100% IS INDICATED AS RATIO OF OFFSET FROM
                    top-left OF DISPLAY VIDEO AREA.

dto:scalingjustify
    "bottom"        : bottomline-justified
    "middle"        : middleline-justified
    "top"           : topline-justified
```

FIG. 5

```
<tt xml:lang=" " xmlns="http://www.w3.org/ns/ttml"
   tts:extent=fullvideo
   xmlns:ttp="http://www.w3.org/ns/ttml#parameter"
   xmlns:tts="http://www.w3.org/ns/ttml#styling"
   xmlns:dto="http://www.example.org/ns/displaytextoverlay"
   dto:dispasp="16:9"
   dto:RPoffset="Ax%, By%">
  <head>
    <layout>
      <region xml:id="r1" tts:origin="OH1% OV1%" tts:extent="EH1% EV1%"/>
      <region xml:id="r2" tts:origin="OH2% OV2%" tts:extent="EH2% EV2%"/>
    </layout>
    <style tts:fontFamily=" proportionalSansSerif" />
  </head>
  <body>
    <div>
      <p xml:id="p1" region="r1"  tts: font-family: 'Arial', 'Tahoma', sans-serif
         dto:scalingjustify=bottom >
        ABCDE
      </p>
      <p xml:id="p2" region="r2"  tts: font-family="monospaceSerif"
         dto:scalingjustify=top>
        FGH
      </p>
    </div>
  </body>
</tt>
```

FIG. 6

16:9 video on 16:9 monitor

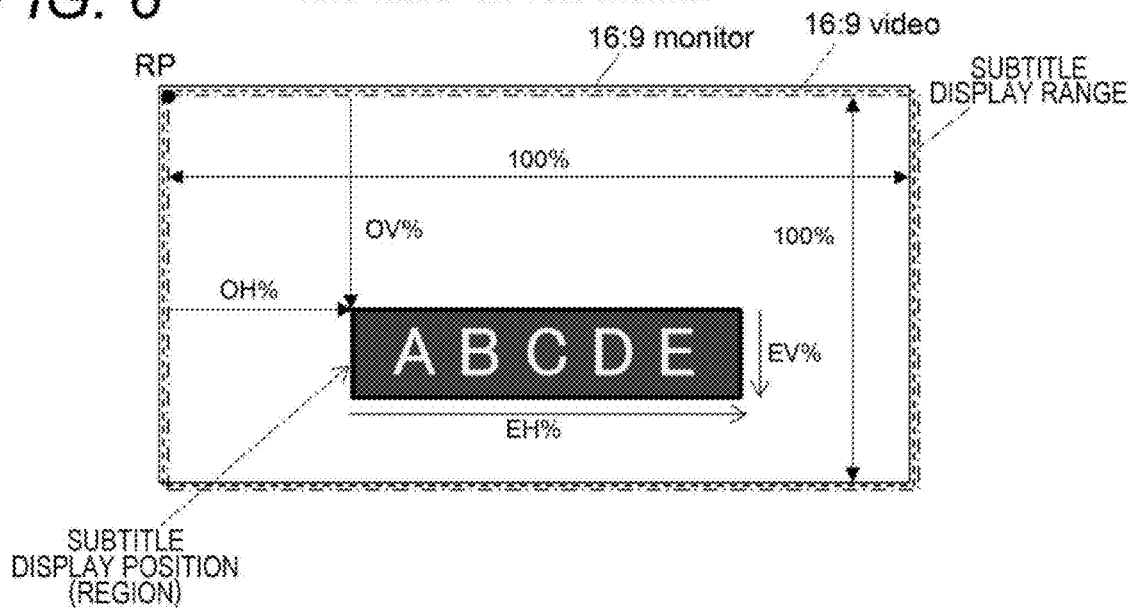

16:9 video on 16:9 monitor

16:9 video on 4:3 monitor

16:9 video on 4:3 monitor

16:9 video on 4:3 monitor

| Syntax | Size | Type |
|---|---|---|
| PES_packet() { | | |
|   PES_startcode_prefix | 24 | bslbf |
|   stream_id | 8 | bslbf |
|   PES_packet_length | 16 | uimsbf |
|   Optional_PES_header() | | |
|   PES_packet_data_byte | 8 | |

(b)

| Syntax | Size | Type |
|---|---|---|
| PES_data_byte_field() { | | |
|   data_identifier | 8 | bslbf |
|   subtitle_stream_id | 8 | bslbf |
|   while nextbits() == '0000 1111' { | | |
|     TimedTextSubtitling_segments() | | |
|   } | | |
|   end_of_PES_data_field_marker | 8 | "0xff" |
| } | | |

PES_startcode_prefix    0x000001
Stream_id    1011 1101    private stream1

FIG. 15

| TT_subtitle Segment_type | TYPE DESCRIPTION |
|---|---|
| 0xA0 | Segment carrying complete TTML document |
| 0xA1 | Segment carrying complete <tt> |
| 0xA2 | Segment carrying complete <head> |
| 0xA3 | Segment carrying <body> |
| 0xA4 | Segment carrying TTML display |
| 0xA5 | Segment carrying font downloading |
| 0xA6 | Segment carrying url_signaling |
| others | Reserved for future use |

FIG. 16

Syntax of TTML_display_segment

| Syntax | Size | Type |
|---|---|---|
| TTML_display_segment () { | | |
| sync_byte | 8 | bslbf |
| segment_type | 8 | bslbf |
| segment_length | 16 | uimsbf |
| tds_version_number | 4 | uimsbf |
| reserved | 4 | bslbf |
| display_aspect_type | 8 | uimsbf |
| reference_point_offset_v | 8 | uimsbf |
| reference_point_offset_h | 8 | uimsbf |
| scaling_justify_flag | 1 | bslbf |
| reserved | 7 | bslbf |
| } | | |

FIG. 17

Semantics of TTML_display_segment segment_type
  0xA4          INDICATES THAT IT IS TTML_display_segment.

tds_version_number
  INDICATES UPDATING OF TTML_display_segment. IN A CASE WHERE THERE IS CHANGE IN ELEMENT, VALUE IS INCREASED BY ONE.

display_aspect_type
  INDICATES ASPECT RATIO OF SUBTITLE DISPLAY RANGE.
  0x01    16:9      0x02        4:3
  0x03    21:9 reference_point_offset_v
  VERTICAL POSITION OF REFERENCE POINT OF SUBTITLE DISPLAY RANGE OF WHEN EACH OF VERTICAL AND HORIZONTAL RANGES OF DISPLAY VIDEO AREA IS SET TO 100% IS INDICATED AS RATIO OF OFFSET FROM top-left OF DISPLAY VIDEO AREA.

reference_point_offset_h
  HORIZONTAL POSITION OF REFERENCE POINT OF SUBTITLE DISPLAY RANGE OF WHEN EACH OF VERTICAL AND HORIZONTAL RANGES OF DISPLAY VIDEO AREA IS SET TO 100% IS INDICATED AS RATIO OF OFFSET FROM top-left OF DISPLAY VIDEO AREA.

scaling_justify_flag
  INDICATES WHETHER OR NOT TO SPECIFY REFERENCE POINT OF SCALING IN A CASE WHERE SCALING OF region IS PERFORMED.

"1"   REFERENCE POINT IS SPECIFIED. IN THAT CASE, WHEN THERE IS A PLURALITY OF regions, FOR region AT UPPERMOST POSITION, LOWER PART OF region IS SET AS REFERENCE (bottom_line_justified). FOR region AT LOWERMOST POSITION, UPPER PART OF region IS SET AS REFERENCE (top_line_justified).

"0"   REFERENCE POINT IS NOT SPECIFIED.

FIG. 18

Syntax of Font_download_segment

| Syntax | Size | Type |
|---|---|---|
| Font_download_segment () { | | |
| sync_byte | 8 | bslbf |
| segment_type | 8 | bslbf |
| segment_length | 16 | uimsbf |
| fds_version_number | 4 | uimsbf |
| reserved | 4 | bslbf |
| original_network_id | 16 | uimsbf |
| transport_stream_id | 16 | uimsbf |
| service_id | 16 | uimsbf |
| font_file_id | 8 | bslbf |
| ISO_639_language_code | 24 | bslbf |
| font_group_id | 8 | bslbf |
| font_name_id | 8 | bslbf |
| text_length | 8 | uimsbf |
| for ( i = 0; i < n ; i++) { | | |
| char | 8 | bslbf |
| } | | |
| } | | |

FIG. 19

Semantics of Font_download_segment

Segment_type
    0x05            INDICATES THAT IT IS Font_download_segment.

fds_version_number
                    INDICATES UPDATING OF Font_download_segment. IN A CASE WHERE THERE IS CHANGE IN ELEMENT,
                    VALUE IS INCREASED BY ONE.

font_file_id(8bits)         IDENTIFICATION NUMBER ASSIGNED TO FONT FILE

ISO_639_language_code(24bits)  CODE INCLUDING THREE CHARACTERS FOR IDENTIFYING LANGUAGE
                                    jpn     JAPANESE
                                    eng     ENGLISH font_group_id (8bits)   IDENTIFICATION INFORMATION OF FONT GROUP AND CORRESPONDS
                        TO GENERIC FAMILY OF TTML
                            0x01    sans-serif
                            0x02    serif
                            0x03    cursive
                            0x04    fantasy
                            0x05    monospace font_name_id (8bits)    INDIVIDUAL FILE NAME
                            0x01    Arial
                            0x02    Tahoma
                            0x03    Courier
                            0x04    Century Gothic
                            0x05    Times New Roman

FIG. 20

Syntax of URL_signaling_segment

| Syntax | Size | Type |
|---|---|---|
| url_signaling_segment () { | | |
| sync_byte | 8 | bslbf |
| segment_type | 8 | bslbf |
| segment_length | 16 | uimsbf |
| uss_version_number | 4 | uimsbf |
| reserved | 4 | bslbf |
| ISO_639_language_code | 24 | bslbf |
| font_group_id | 8 | bslbf |
| font_name_id | 8 | bslbf |
| url_type | 8 | uimsbf |
| url_string_length | 8 | uimsbf |
| for ( i = 0; i < url_string_length ; i++) { | | |
| char | 8 | bslbf |
| } | | |
| } | | |

FIG. 21

Semantics of URL_signaling_segment

Segment_type
  0x06    INDICATES THAT IT IS URL_signaling_segment.

uss_version_number
  INDICATES UPDATING OF URL_signaling_segment. IN A CASE WHERE THERE IS CHANGE IN ELEMENT, VALUE IS INCREASED BY ONE.

ISO_639_language_code(24bits)  CODE INCLUDING THREE CHARACTERS FOR IDENTIFYING LANGUAGE
    jpn    JAPANESE
    eng    ENGLISH font_group_id (8bits)  IDENTIFICATION INFORMATION OF FONT GROUP AND CORRESPONDS TO GENERIC FAMILY OF TTML
    0x01  sans-serif
    0x02  serif
    0x03  cursive
    0x04  fantasy
    0x05  monospace font_name_id (8bits)  INDIVIDUAL FILE NAME
    0x01  Arial
    0x02  Tahoma
    0x03  Courier
    0x04  Century Gothic
    0x05  Times New Roman url_type (8bits)
  INDICATES TYPE OF SERVER
    0x01  FONT SERVER (UNCOMPRESSED URL)
    0x02  GENERAL SERVER (UNCOMPRESSED URL)
    0x11  FONT SERVER (COMPRESSED URL)
    0x12  GENERAL SERVER (COMPRESSED URL)

FIG. 22

Syntax of TTML_display_descriptor

| Syntax | Size | Type |
|---|---|---|
| TTML_display_descriptor(){ | | |
| descriptor_tag | 8 | uimsbf |
| descriptor_length | 8 | uimsbf |
| display_aspect_type | 8 | uimsbf |
| reference_point_offset_v | 8 | uimsbf |
| reference_point_offset_h | 8 | uimsbf |
| scaling_justify_flag | 1 | bslbf |
| reserved | 7 | bslbf |
| text_length | 8 | uimsbf |
| for ( j = 0; i < n ; i++) { | | |
| char | 8 | bslbf |
| } | | |
| } | | |

FIG. 23

Syntax of Font_download_descriptor

| Syntax | Size | Type |
|---|---|---|
| Font_download_descriptor ( ) { | | |
| descriptor_tag | 8 | uimsbf |
| descriptor_length | 8 | uimsbf |
| original_network_id | 16 | uimsbf |
| transport_stream_id | 16 | uimsbf |
| service_id | 16 | uimsbf |
| font_file_id | 8 | bslbf |
| ISO_639_language_code | 24 | bslbf |
| font_group_id | 8 | bslbf |
| font_name_id | 8 | bslbf |
| text_length | 8 | uimsbf |
| for ( i = 0; i < n; i++) { | | |
| char | 8 | bslbf |
| } | | |
| } | | |

FIG. 24

Syntax of URL_signaling_descriptor

| Syntax | Size | Type |
|---|---|---|
| URL_signaling_descriptor(){ | | |
| descriptor_tag | 8 | uimsbf |
| descriptor_length | 8 | uimsbf |
| ISO_639_language_code | 24 | bslbf |
| font_group_id | 8 | bslbf |
| font_name_id | 8 | bslbf |
| url_type | 8 | bslbf |
| url_string_length | 8 | uimsbf |
| for( i = 0; i < url_string_length ; i++) { | | |
| char | 8 | bslbf |
| } | | |
| } | | |

FIG. 25
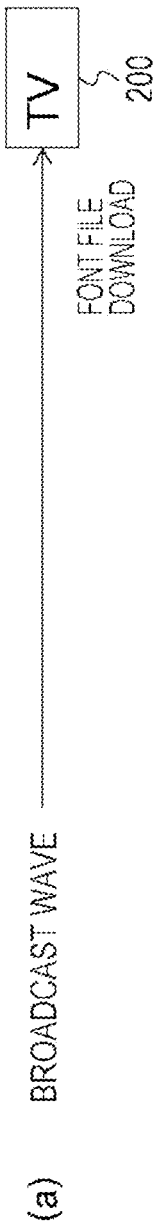
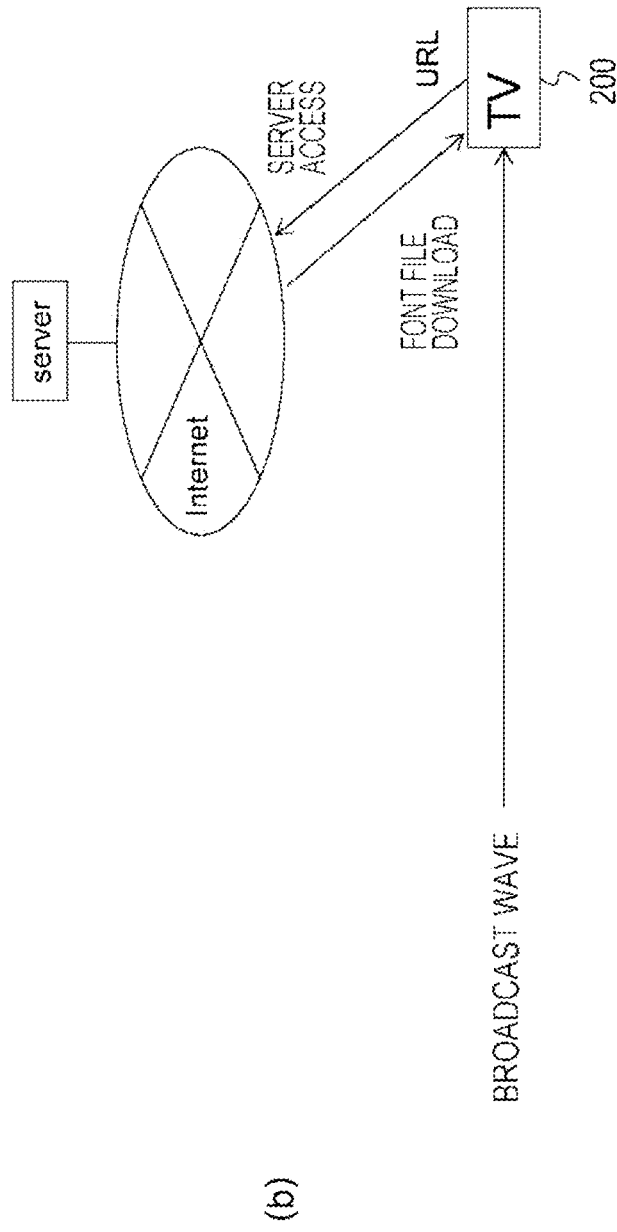

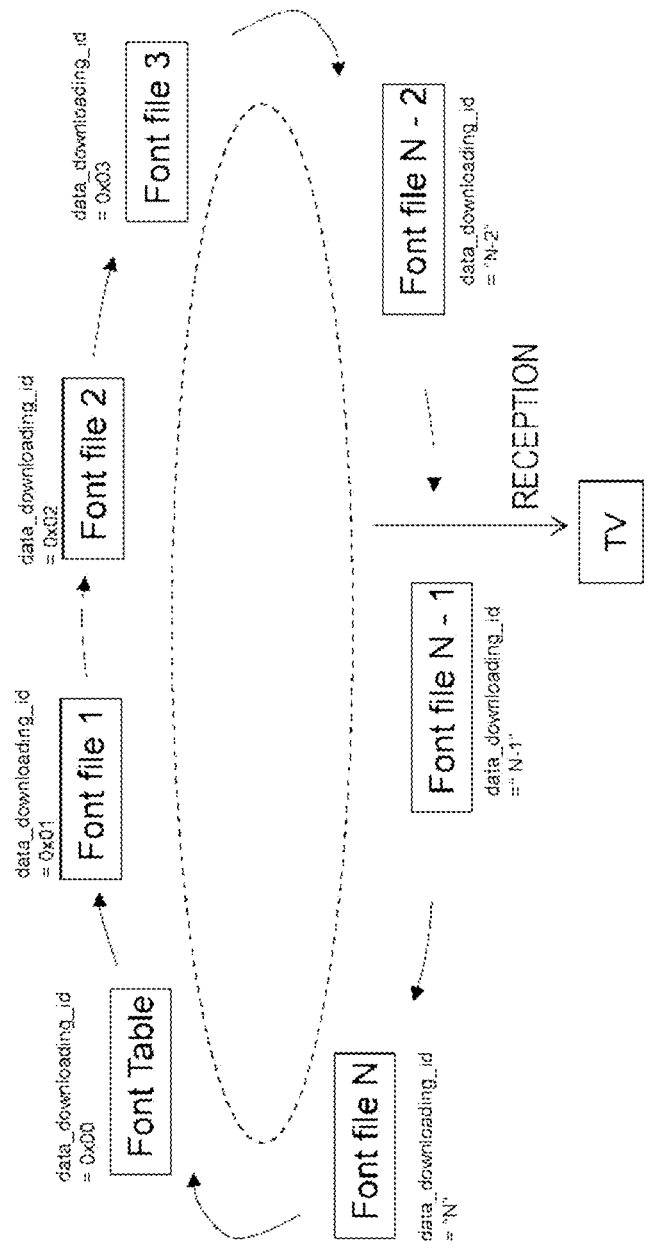

FIG. 27    Syntax of Font_downloading_section

| Syntax | Size | Type |
|---|---|---|
| Font_downloading_section(){ | | |
| table_id | 8 | uimsbf |
| section_syntax_indicator | 1 | bslbf |
| private_indicator | 1 | bslbf |
| reserved | 2 | bslbf |
| section_length | 12 | uimsbf |
| data_downloading_id | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| original_network_id | 16 | uimsbf |
| transport_stream_id | 16 | uimsbf |
| service_id | 16 | uimsbf |
| descriptor() | | |
| } | | |
| for ( i = 0; i < section_length − 13 − descriptor_length ; i++) { | | |
| data_byte | 8 | bslbf |
| } | | |
| CRC_32 | 32 | rpchof |
| } | | |

FIG. 28

Semantics of Font_downloading_section

| | |
|---|---|
| table_id | SPECIFIES VALUE INDICATING Font Download Section. |
| data_downloading_id | IDENTIFICATION INFORMATION OF DOWNLOAD DATA AND INDICATES UNIQUE VALUE DEFINED FOR EACH original_network_id |
| | 0x00        INDICATES THAT IT IS FONT TABLE INFORMATION |
| | OTHER THAN 0x00   INDICATES THAT IT IS FONT FILE INFORMATION |
| version_number | IN A CASE WHERE THERE IS CHANGE IN ELEMENT, VALUE IS INCREASED |
| original_network_id | SPECIFICATION OF NETWORK THROUGH WHICH DOWNLOAD DATA IS TRANSMITTED |
| transport_stream_id | IDENTIFICATION INFORMATION OF INDIVIDUAL TRANSPORT STREAM |
| service_id | IDENTIFICATION INFORMATION OF SERVICE TO BE DOWNLOADED |

(BY USING original_network_id, transport_stream_id, AND service_id TOGETHER, IT BECOMES POSSIBLE TO MAKE IT COMMON DOWNLOAD TARGET BETWEEN DISTRIBUTION MEDIA.)

FIG. 29

FONT TABLE INFORMATION
(data_downloading_id = 0x00)

Font_table_descriptor()

| | |
|---|---|
| Font_file_id | 01 |
| ISO_639_language_code | -> English |
| font_group_id | 01 ( Sans-Serif ) |
| font_name_id | -> 'arial' |

| | |
|---|---|
| Font_file_id | 02 |
| ISO_639_language_code | -> English |
| font_group_id | 01 ( Sans-Serif ) |
| font_name_id | -> 'Tahoma' |

| | |
|---|---|
| Font_file_id | 03 |
| ISO_639_language_code | -> English |
| font_group_id | 05 ( monospace ) |
| font_name_id | -> "Courier' |

| Font_group_id | Font group name |
|---|---|
| 0x01 | sans-serif { font-family: sans-serif; } |
| 0x02 | serif { font-family: serif; } |
| 0x03 | cursive { font-family: cursive; } |
| 0x04 | fantasy { font-family: fantasy; } |
| 0x05 | monospace { font-family: monospace; |
| ⋮ | ⋮ |

FIG. 31

Syntax of Font_table_descriptor

| Syntax | Size | Type |
|---|---|---|
| Font_table_descriptor(){ | | |
|   descriptor_tag | 8 | uimsbf |
|   descriptor_length | 8 | uimsbf |
|   number_of_font_files | 8 | uimsbf |
|   for ( i = 0; i < number_of_font_files ; i++) { | | |
|     font_file_id | 8 | bslbf |
|     ISO_639_language_code | 24 | bslbf |
|     font_group_id | 8 | bslbf |
|     font_name_id | 8 | bslbf |
|     text_length | 8 | uimsbf |
|     for ( i = 0; i < n ; i++) { | | |
|       char | 8 | bslbf |
|     } | | |
|   } | | |
| } | | |

FONT FILE INFORMATION
(data_downloading_id != 0x00)

Font_file_descriptor()

| Font_file_id | 01 |
| ISO_639_language_code | -> English |
| font_group_id | -> Sans-Serif |
| font_name_id | -> 'Tahoma' |

Font file

FIG. 33

Syntax of Font_file_descriptor

| Syntax | Size | Type |
|---|---|---|
| Font_file_descriptor(){ | | |
| descriptor_tag | 8 | uimsbf |
| descriptor_length | 8 | uimsbf |
| font_file_id | 8 | bsibf |
| ISO_639_language_code | 24 | bsibf |
| font_group_id | 8 | bsibf |
| font_name_id | 8 | bsibf |
| text_length | 8 | uimsbf |
| for ( i = 0; i < n ; i++) { | | |
| char | 8 | bsibf |
| } | | |
| } | | |

FIG. 42

```
<tt xml:lang=" " xmlns="http://www.w3.org/ns/ttml"
  tts:extent=fullvideo
  xmlns:ttp="http://www.w3.org/ns/ttml#parameter"
  xmlns:tts="http://www.w3.org/ns/ttml#styling"
  xmlns:dto="http://www.example.org/ns/displaytextoverlay"
  dto:dispasp="16:9"
  dto:RPoffset="Ax%, By%">
  <head>
    <layout>
      <region xml:id="r1" tts:origin="OH1% OV1%" tts:extent="EH1% EV1%"/>
      <region xml:id="r2" tts:origin="OH2% OV2%" tts:extent="EH2% EV2%"/>
    </layout>
    <style tts:fontFamily=" proportionalSansSerif" />
  </head>
  <body>
    <div>
      <metadata xmlns:fontdlurl=http://www.w3.org/ns/fontdlservice
          fontdlurl:iso639languagecode="value"
          fontdlurl:fontgroupid="value"
          fontdlurl:fontnameid="value"
          fontdlurl:fontname="value">
      <p xml:id="p1" region="r1" tts: font-family: 'Arial', 'Tahoma', sans-serif
        dto:scalingjustify=bottom >
          ABCDE
      </p>
      <p xml:id="p2" region="r2" tts: font-family="monospaceSerif"
        dto:scalingjustify=top>
          FGH
      </p>
    </div>
  </body>
</tt>
```

TRANSMISSION DEVICE, TRANSMISSION METHOD, RECEPTION DEVICE AND RECEPTION METHOD

TECHNICAL FIELD

The present technology relates to a transmission device, a transmission method, a reception device, and a reception method, and in particular relates to a transmission device and the like that transmit text information of a subtitle together with video data.

BACKGROUND ART

Conventionally, for example, in broadcasting of digital video broadcasting (DVB) and the like, operation has been performed of transmitting subtitle information as bitmap data. Recently, it has been devised to transmit the subtitle information as text character codes, that is, text-based transmission. As the text information, for example, Timed Text Markup Language (TTML) has been advocated by the World Wide Web Consortium (W3C) (see Patent document 1).

Conventionally, it has been known that a subtitle display position in subtitle display position information included in text information of a subtitle is specified, for example, as a relative position with respect to a video area. In this case, in a case where an aspect ratio of the video area does not coincide with an aspect ratio of a display area, a part of the subtitle sometimes sticks out of the display area and is not displayed depending on a display method. In addition, conventionally, it has been known that the text information of the subtitle is transmitted including font specification information.

CITATION LIST

Patent Document

Patent document 1: Japanese Patent Application Laid-Open No. 2012-169885

SUMMARY OF THE INVENTION

Problems to be Solved by the Invention

In order to avoid that a part of the subtitle sticks out of the display area and is not displayed as described above, for example, it is conceivable to perform processing, in the reception side, as not a relative position with respect to the video area but a relative position with respect to a video area (display video area) displayed on a monitor (display). In that case, in a case where the aspect ratio of the video area is different from an aspect ratio of the display video area, for example, the subtitle display position is compressed only in the horizontal direction, and there is a possibility that subtitle display is made giving a viewer a sense of discomfort. In addition, in a case where the text information of the subtitle is transmitted including the font specification information as described above, in a case where a file of a font specified is not mounted in the reception side, subtitle display is not possible with the font specified, and there is a possibility that subtitle display is not made as intended by a creator.

An object of the present technology is to make it possible to satisfactorily perform subtitle display in the reception side.

Solutions to Problems

A concept of the present technology is in
a transmission device including:
a transmission unit that transmits a container of a predetermined format, the container including a video stream including video data and a subtitle stream including text information of a subtitle, the text information including subtitle display position information for specifying a subtitle display position as a relative position with respect to a subtitle display range; and
an information insertion unit that inserts, into a container of the subtitle stream, auxiliary information to be used when the subtitle is displayed by using the subtitle position information.

In the present technology, the transmission unit transmits the container of the predetermined format including the video stream including the video data and the subtitle stream including the text information of the subtitle. The text information of the subtitle includes the subtitle display position information for specifying the subtitle display position as the relative position with respect to the subtitle display range.

The information insertion unit inserts the auxiliary information to be used when the subtitle is displayed by using the subtitle position information into the container of the subtitle stream. It is preferable that, for example, the auxiliary information is inserted into a PES packet and/or a program map table.

It is preferable that, for example, the auxiliary information includes information regarding resizing processing of the subtitle display position determined on the basis of the subtitle display position information, the resizing processing being performed in the reception side in a case where an aspect ratio of a video area is different from an aspect ratio of a display video area. In this case, it is preferable that, for example, the information regarding the resizing processing is information indicating a line position to be set as a fixed position in a case where a size in a vertical direction is compressed in the resizing processing of the subtitle display position.

In addition, it is preferable that, for example, the auxiliary information includes information for determining the subtitle display range. In this case, it is preferable that, for example, the information for determining the subtitle display range is reference point information and aspect ratio information of the subtitle display range.

As described above, in the present technology, the auxiliary information to be used when the subtitle is displayed by using the subtitle position information is inserted into the container of the subtitle stream. For that reason, in the reception side, by using the auxiliary information together with the subtitle position information, it becomes possible to appropriately acquire the subtitle display position and satisfactorily perform subtitle display.

In addition, another concept of the present technology is in
a reception device including:
a reception unit that receives a container of a predetermined format, the container including a video stream including video data and a subtitle stream including text information of a subtitle, the text information including subtitle display position information for specifying a subtitle display position as a relative position with respect to a subtitle display range; and
a control unit that controls processing of decoding the video stream to obtain the video data, processing of performing decoding processing on the subtitle stream to obtain bitmap data of the subtitle, processing of performing display position control on the bitmap data of the subtitle on the basis of the subtitle display position acquired by using the subtitle display position information and auxiliary information to be used when the subtitle is displayed by using the subtitle position information inserted into a container of the subtitle stream, and processing of superimposing the bitmap data of the subtitle subjected to the display position control on the video data.

In the present technology, the reception unit receives the container of the predetermined format including the video stream including the video data and the subtitle stream including the text information of the subtitle. The text information of the subtitle includes the subtitle display position information for specifying the subtitle display position as the relative position with respect to the subtitle display range. The auxiliary information to be used when the subtitle is displayed by using the subtitle position information is inserted into the container of the subtitle stream.

The control unit controls the processing of decoding the video stream to obtain the video data, the processing of performing decoding processing on the subtitle stream to obtain the bitmap data of the subtitle, the processing of performing the display position control on the bitmap data of the subtitle on the basis of the subtitle display position acquired by using the subtitle display position information and the auxiliary information, and the processing of superimposing the bitmap data of the subtitle subjected to the display position control on the video data.

For example, it is preferable that the auxiliary information includes information regarding resizing processing of the subtitle display position determined on the basis of the subtitle display position information, the resizing processing being performed in the reception side in a case where an aspect ratio of a video area is different from an aspect ratio of a display video area, and in the processing of performing the display position control, in the case where the aspect ratio of the video area is different from the aspect ratio of the display video area, the display video area is set as the subtitle display range and the subtitle display position is determined on the basis of the subtitle display position information, the resizing processing is performed by using the information regarding the resizing processing on the subtitle display position determined, and the display position control is performed on the bitmap data of the subtitle on the basis of the subtitle display position subjected to the resizing processing.

In addition, for example, it is preferable that the auxiliary information includes information for determining the subtitle display range, and in the processing of performing the display position control, in the case where the aspect ratio of the video area is different from the aspect ratio of the display video area, the subtitle display range is set in the display video area on the basis of the information for determining the subtitle display range, the subtitle display position is determined on the basis of the subtitle display position information, and the display position control is performed on the bitmap data of the subtitle on the basis of the subtitle display position determined.

As described above, in the present technology, the auxiliary information to be used when the subtitle is displayed by using the subtitle position information is inserted into the container of the subtitle stream, and the display position control is performed on the bitmap data of the subtitle on the basis of the subtitle display position acquired by using the subtitle display position information and the auxiliary information. For that reason, it becomes possible to satisfactorily perform subtitle display.

In addition, another concept of the present technology is in a transmission device including:

a transmission unit that transmits a container of a predetermined format, the container including a video stream including video data and a subtitle stream including text information of a subtitle, the text information including font specification information; and an information insertion unit that inserts download information for downloading a file of a font specified by at least the font specification information into a container of the subtitle stream.

In the present technology, the transmission unit transmits the container of the predetermined format including the video stream including the video data and the subtitle stream including the text information of the subtitle. The text information of the subtitle includes the font specification information.

The information insertion unit inserts the download information for downloading the file of the font specified by at least the font specification information into the container of the subtitle stream. It is preferable that, for example, the auxiliary information is inserted into a PES packet and/or a program map table. It is preferable that, for example, the download information is information for acquiring the file of the font from a broadcast signal, or is information for acquiring the file of the font from a server on a network.

As described above, in the present technology, the download information for downloading the file of the font specified by at least the font specification information is inserted into the container of the subtitle stream. For that reason, in the reception side, in a case where the file of the font specified by the font specification information is not included, it becomes possible to acquire the file of the font specified by the font specification information on the basis of the download information, and to satisfactorily perform subtitle display.

In addition, another concept of the present technology is in a reception device including:

a reception unit that receives a container of a predetermined format, the container including a video stream including video data and a subtitle stream including text information of a subtitle, the text information including font specification information; and a control unit that controls processing of decoding the video stream to obtain the video data, processing of acquiring a font file of a font specified by the font specification information on the basis of download information for downloading a file of the font specified by at least the font specification information inserted into a container of the subtitle stream, processing of decoding the subtitle stream and obtaining bitmap data of the subtitle on the basis of the font file acquired, and processing of superimposing the bitmap data of the subtitle on the video data.

In the present technology, the reception unit receives the container of the predetermined format including the video stream including the video data and the subtitle stream including the text information of the subtitle. The text information of the subtitle includes the font specification information. The download information for downloading the file of the font specified by at least the font specification information is inserted into the container of the subtitle stream.

The control unit controls the processing of decoding the video stream to obtain the video data, the processing of acquiring the font file of the font specified by the font specification information on the basis of the download information, the processing of decoding the subtitle stream and obtaining the bitmap data of the subtitle on the basis of the font file acquired, and the processing of superimposing the bitmap data of the subtitle on the video data.

As described above, in the present technology, the download information for downloading the file of the font specified by at least the font specification information is inserted into the container of the subtitle stream, and the font file of the font specified by the font specification information is acquired on the basis of the download information, and is used when the bitmap data of the subtitle is obtained. For that reason, even in a case where the file of the font specified by the font specification information is not included, it becomes possible to satisfactorily perform subtitle display.

In addition, another concept of the present technology is in a transmission device including:

a section table insertion unit that sequentially and repeatedly inserts a constant number of section tables respectively including different font files into a transport stream; and a transmission unit that transmits the transport stream into which the section tables are inserted.

In the present technology, the section table insertion unit sequentially and repeatedly inserts the predetermined number of section tables respectively including different font files into the transport stream. The transmission unit transmits the transport stream into which the section tables are inserted. In this case, the predetermined number of section tables are sequentially and repeatedly transmitted by a data carousel.

As described above, in the present technology, the predetermined number of section tables respectively including different font files are sequentially and repeatedly inserted into the transport stream. For that reason, in the reception side, it becomes possible to easily acquire the font file of the font specified by, for example, the font specification information included in the text information of the subtitle, from the transport stream.

Effects of the Invention

According to the present technology, it becomes possible to satisfactorily perform subtitle display in the reception side. Note that, the advantageous effects described in this specification are merely examples, and the advantageous effects of the present technology are not limited to them and may include additional effects.

BRIEF DESCRIPTION OF DRAWINGS

FIG. 2 is a diagram illustrating an example of a subtitle display position (region) determined by subtitle display position information.

FIG. 3 is a diagram illustrating an example structure of TTML (one subtitle display position).

FIG. 4 is a diagram illustrating details of main information in a TTML structure.

FIG. 5 is a diagram illustrating an example structure of the TTML (two subtitle display positions).

FIG. 6 is a diagram illustrating a display example (one subtitle display position) of a subtitle in a case where an aspect ratio of a video area is the same as an aspect ratio of a display video area.

FIG. 14 is a diagram illustrating an example structure of a subtitle PES packet and an example structure of "PES_data_byte_field( )".

FIG. 15 is a diagram illustrating an example of a definition of a segment type.

FIG. 16 is a diagram illustrating an example structure of a TTML display segment.

FIG. 17 is a diagram illustrating details of main information in the example structure of the TTML display segment.

FIG. 18 is a diagram illustrating an example structure of a font download segment.

FIG. 19 is a diagram illustrating details of main information in the example structure of the font download segment.

FIG. 20 is a diagram illustrating an example structure of a URL signaling segment.

FIG. 21 is a diagram illustrating details of main information in the example structure of the URL signaling segment.

FIG. 22 is a diagram illustrating an example structure) of a TTML display descriptor.

FIG. 23 is a diagram illustrating an example structure of a font download descriptor.

FIG. 24 is a diagram illustrating an example structure of a font download descriptor.

FIG. 25 is a diagram illustrating an outline of a case (Case 1) in which a file of a font specified by font specification information of the TTML is acquired from a transport stream TS (broadcast signal) and a case (Case 2) in which the file is acquired from a server on a network.

FIG. 26 is a diagram schematically illustrating that one section table including a font table (Font Table) is repeatedly transmitted by a data carousel in addition to N section tables each including a font file (Font file).

FIG. 27 is a diagram illustrating an example structure of a font downloading section table.

FIG. 28 is a diagram illustrating details of main information in the example structure of the font downloading section table.

FIG. 29 is a diagram schematically illustrating font table information described in the font downloading section table when "data_downloading_id" is "0x00".

FIG. 30 is a diagram illustrating a correspondence between a value of "font_group_id" and a font group.

FIG. 31 is a diagram illustrating an example structure of a font table descriptor.

FIG. 33 is a diagram illustrating an example structure of a font file descriptor.

FIG. 42 is a diagram illustrating an example structure of the TTML (two subtitle display positions).

MODE FOR CARRYING OUT THE INVENTION

The following is a description of a mode for carrying out the invention (the mode will be hereinafter referred to as the "embodiment"). Note that, explanation will be made in the following order.
1. Embodiment
2. Modifications 1. Embodiment

[Example Configuration of Transmission/Reception System]

Figure 1:
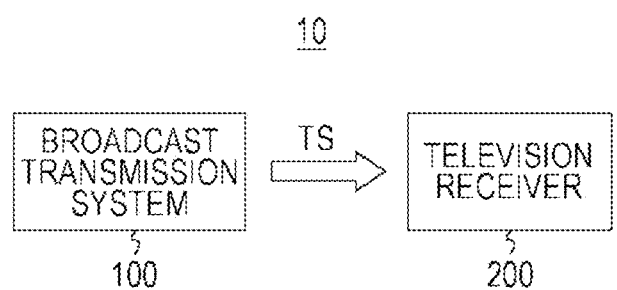
FIG. 1 is a block diagram illustrating an example configuration of a transmission/reception system as an embodiment.

FIG. 1 illustrates an example configuration of a transmission/reception system 10 as an embodiment. The transmission/reception system 10 is configured by a broadcast transmission system 100 and a television receiver 200. The broadcast transmission system 100 transmits a transport stream of MPEG-2 TS (hereinafter simply referred to as "transport stream TS") as a container (multiplexed stream) on a broadcast wave.

The transport stream TS includes a video stream including video data, and a subtitle stream including text information of a subtitle. Here, as the text information of the subtitle, for example, TTML, a derived format of the TTML, or the like can be considered; however, in the embodiment, it is assumed to be the TTML. The TTML includes subtitle display position information, and the subtitle display position information specifies a subtitle display position (region) as a relative position (proportional value) with respect to a subtitle display range. In addition, the TTML includes font specification information.

The broadcast transmission system 100 inserts auxiliary information to be used when the subtitle is displayed by using the subtitle display position information, into the container of the TTML and/or the subtitle stream. In the embodiment, the broadcast transmission system 100 includes the auxiliary information in the TTML, and also inserts the auxiliary information into a Packetized Elementary Stream (PES) packet and a Program Map Table (PMT).

The auxiliary information includes information regarding resizing processing of the subtitle display position determined on the basis of the subtitle display position information, the resizing processing being performed in the reception side in a case where an aspect ratio of a video area is different from an aspect ratio of a display video area. The information regarding the resizing processing is, for example, information indicating a line position to be set as a fixed position in a case where the size in the vertical direction is compressed in the resizing processing of the subtitle display position. In addition, the auxiliary information includes information for determining the subtitle display range. For example, the information for determining the subtitle display range is reference point information and aspect ratio information of the subtitle display range.

In addition, the broadcast transmission system 100 inserts download information for downloading a file of a font specified by at least the font specification information into the container of the subtitle stream. The download information is information for acquiring the font file from a broadcast signal (transport stream TS), information for acquiring the font file from a server on a network, or the like. In the embodiment, the broadcast transmission system 100 inserts the download information into the Packetized Elementary Stream (PES) packet and the Program Map Table (PMT).

In addition, the broadcast transmission system 100 sequentially and repeatedly inserts a predetermined number of section tables respectively including different font files into the transport stream TS as the broadcast signal. That is, the broadcast transmission system 100 repeatedly transmits the predetermined number of section tables by a data carousel. Note that, the transport stream TS into which the section tables each including the font file are inserted is not necessarily the same as the above-described transport stream TS including the subtitle stream, and may be the transport stream TS of another service.

The television receiver 200 receives the transport stream TS transmitted from the broadcast transmission system 100. The television receiver 200 performs decoding processing on the video stream including the video data to obtain the video data, and performs decoding processing on the subtitle streams including the TTML as the text information of the subtitle to obtain bitmap data of the subtitle.

The television receiver 200 uses the file of the font specified by the font specification information included in the TTML when obtaining the bitmap data of the subtitle. As described above, the download information for downloading the file of the font specified by at least the font specification information is inserted into the PES packet and the Program Map Table (PMT). When the file of the font specified by the font specification information is not mounted, the television receiver 200 downloads and uses the font file on the basis of the download information.

As described above, in the subtitle display position information included in the TTML, the subtitle display position is specified as the relative position with respect to the subtitle display range. In addition, as described above, the auxiliary information to be used when the subtitle is displayed by using the subtitle display position information is included in the TTML, and is also inserted into the PES packet and the PMT.

The television receiver 200 uses the subtitle display position information and the auxiliary information to acquire the subtitle display position, and performs display position control on the bitmap data of the subtitle on the basis of the subtitle display position acquired. The television receiver 200 superimposes the bitmap data of the subtitle subjected to the display position control on the video data, to obtain the video data for display.

In a case where the aspect ratio of the video area is different from the aspect ratio of the display video area (the video area displayed on a monitor), the television receiver 200 selectively performs a first method or a second method below, as the display position control for the bitmap data of the subtitle.

In the first method, in the case where the aspect ratio of the video area is different from the aspect ratio of the display video area, the television receiver 200 sets the display video area as the subtitle display range and determines the subtitle display position on the basis of the subtitle display position information, and then performs resizing processing on the subtitle display position determined, to acquire the final subtitle display position. The television receiver 200 performs display position control on the bitmap data of the subtitle on the basis of the subtitle display position thus acquired.

The resizing processing is processing for restoring an original shape as the subtitle display position, and for example, in a case where the subtitle display position determined is compressed only in the horizontal direction, compression is also performed in the vertical direction with the same proportion. For example, in a case where the size in the vertical direction is compressed in the resizing processing, compression is performed in a state where a predetermined line position is fixed such as a top line (upper line), a bottom line (lower line), or a middle line (intermediate line).

By appropriately selecting the predetermined line position, for example, in a case where there are two subtitle display positions, it becomes possible to maintain an interval in the vertical direction between the two subtitle display positions even if the resizing processing is performed. When information indicating the line position to be set as the fixed position is inserted, as the information regarding the resizing processing, into the TTML, PES packet, PMT, or the like, the television receiver 200 can use the information.

In the second method, in a case where the aspect ratio of the video area is different from the aspect ratio of the display video area, the television receiver 200 sets the subtitle display range in the display video area, determines the subtitle display position on the basis of the subtitle display position information, and acquires the final subtitle display position. The television receiver 200 performs display position control on the bitmap data of the subtitle on the basis of the subtitle display position thus acquired.

When the information is inserted for determining the subtitle display range inserted into the TTML, PES packet, PMT, or the like, the television receiver 200 can use the information to appropriately set the subtitle display range. For example, the television receiver 200 selects the second method when the information for determining the subtitle display range is included in the TTML, PES packet, PMT, or the like, and selects the first method when the information is not included.

FIG. 2 illustrates an example of the subtitle display position (region) determined by the subtitle display position information. The example illustrates a case where the subtitle display position information is given, in the TTML, as information "origin="OH % OV %"" indicating an origin of the subtitle display position and information "extent="EH % EV %"" indicating an area (extent) of the subtitle display position. "RP" indicates a reference point (Reference Pont) that is the top-left of the subtitle display range.

FIG. 2(*a*) illustrates an example in a case where the aspect ratio of the video area is the same as the aspect ratio of the display video area. In the example, the aspect ratio of the video area is 16:9, the aspect ratio of the monitor is 16:9, and the aspect ratio of the display video area is 16:9. In this case, the display video area is set as the subtitle display range, and the subtitle display position is determined on the basis of the subtitle display position information specified as the relative position with respect the subtitle display range.

FIG. 2(*b*) is an example in a case where the aspect ratio of the video area is different from the aspect ratio of the display video area, the display video area is set as the subtitle display range, and the subtitle display position is determined on the basis of the subtitle display position information (the first method). The example is a case where the aspect ratio of the video area is 16:9, the aspect ratio of the monitor is 4:3, the display method is Center-cut, and the aspect ratio of the display video area is 4:3. In this case, as compared with the case of FIG. 2(*a*), the subtitle display position has the same width in the vertical direction, but its width is compressed in the horizontal direction. In this case, the shape of the subtitle display position is different from the case of FIG. 2(*a*).

FIG. 2(*c*) is an example in a case where the aspect ratio of the video area is different from the aspect ratio of the display video area, the subtitle display range is set in the display video area, and the subtitle display position is determined on the basis of the subtitle display position information (a second method). The example is a case where the aspect ratio of the video area is 16:9, the aspect ratio of the monitor is 4:3, the display method is Center-cut, and the aspect ratio of the display video area is 4:3. In this case, as compared with the case of FIG. 2(*a*), the width of the subtitle display position is compressed in both the vertical direction and the horizontal direction. In a case where the aspect ratio of the subtitle display range set is 16:9, the shape of the subtitle display position is the same as in the case of FIG. 2(*a*).

FIG. 3 illustrates an example of a TTML structure. The example is a case where there is one subtitle display position (region). The TTML is described basically in XML. In the tt root container, a language and a namespace are defined. The namespace is defined as a unique element name that can be uniquely identified in all elements in a system or a standard system. In addition, in <tt>, "tts:extent" declares a target area of 100% of a video as a source of a target of the subtitle position information first, and "fullvideo" indicates the entire video of a resolution of 3840 (H)×2160 (V) in a case where a 4K video is the target, and indicates the entire video of a resolution of 1920 (H)×1080 (V) in a case where a 2K (full HD) video is the target.

"xmlns=http://www.w3.org/ns/ttml", "xmlns:ttp=http://www.w3.org/ns/ttml#parameter", and "xmlns:tts=http://www.w3.org/ns/ttml#styling" are namespaces such as a parameter, styling, and the like that are secured as attribute classifications of the TTML in W3C in advance, although detailed descriptions are omitted.

"xmlns:dto=http://www.example.org/ns/displaytextoverlay" is a newly defined namespace. The namespace is for inserting information on the subtitle display range. Then, "dto:dispasp="16:9"" and "dto:RPoffset="Ax %, By %"" indicate the information on the subtitle display range.

The "dto:dispasp="16:9"" indicates the aspect ratio information of the subtitle display range, and indicates that the subtitle display range is an area of the aspect ratio of 16:9. In the illustrated example, it is illustrated that the aspect ratio of the subtitle display range is 16:9; however, as the aspect ratio of the subtitle display range, it is also possible to specify 4:3, 21:9, or the like, as illustrated in FIG. 4. The "dto:RPoffset="Ax %, By %"" indicates the reference point information of the subtitle display range, and as illustrated in FIG. 4, a position of the reference point (Reference Point (RP)) of the subtitle display range of when each of the horizontal and vertical ranges of the display video area is set to 100% is indicated as a ratio of an offset from the top-left of the display video area.

An element of the layout exists in the head. The region ID is indicated by "r1", and as the subtitle display position information, the origin of the subtitle display position and the area (extent) are indicated as relative positions. That is, the "origin="OH % OV %"" indicates the origin of the subtitle display position, and indicates that the origin is at OH from the left and OV % from the top. In addition, the "extent="EH % EV %"" indicates the area of the subtitle display position, and indicates that the horizontal width is EH % and the vertical width is EV %.

In addition, an element of the style exists in the head. "fontFamily="proportionalSansSerif"" is the font specification information. Here, the "proportionalSansSerif" indicates a generic family (generic name) of the font.

In the body, the XML ID is indicated by "p1", the region ID is indicated by "r1", font specification is made, and text data of the subtitle is described. Here, the text data is set as "ABCDE". "Font-family: 'Arial', 'Tahoma', sans-serif" is the font specification information specifying the font of the p element. Here, the "Arial" and the "Tahoma" indicate individual font names and the "sans-serif" indicates a generic family (generic name) of the font.

"dto:scalingjustify=top" constitutes information regarding the resizing processing, and indicates the line position to be set as the fixed position in the case where the size in the vertical direction is compressed by the resizing processing of the subtitle display position. In the illustrated example, it is illustrated that the line position to be set as the fixed position is the top line (upper line); however, it is also possible to specify the bottom line (lower line), the middle line (intermediate line), or the like, as illustrated in FIG. 4.

FIG. 5 also illustrates an example of the TTML structure. The example is a case where there are two subtitle display positions (regions). The tt root container is the same as in FIG. 3, so that the description thereof will be omitted.

An element of the layout exists in the head. The region ID of a first subtitle display position is indicated by "r1", and as the subtitle display position information, the origin of the subtitle display position and the area (extent) are indicated as relative positions. That is, "origin="OH1% OV1%"" indicates that the origin is at OH1% from the left and OV1% from the top. In addition, "extent="EH1% EV1%"" indicates that the horizontal width of the area is EH1% and the vertical width of the area is EV1%.

In addition, the region ID of a second subtitle display position is indicated by "r2", and as the subtitle display position information, the origin of the subtitle display position and the area (extent) are indicated as relative positions. That is, "origin="OH2% OV2%"" indicates that the origin is at OH2% from the left and OV2% from the top. In addition, "extent="EH2% EV2%"" indicates that the horizontal width of the area is EH2% and the vertical width of the area is EV2%.

In addition, an element of the style exists in the head. "fontFamily="proportionalSansSerif"" is the font specification information. Here, the "proportionalSansSerif" indicates a generic family (generic name) of the font.

In the body, in association with the first subtitle position, the XML ID is indicated by "p1", the region ID is indicated by "r1", font specification is made, and text data of the subtitle is described. Here, the text data is set as "ABODE". "Font-family: 'Arial', 'Tahoma', sans-serif" is the font specification information specifying the font of the p element. Here, the "Arial" and the "Tahoma" indicate individual font names and the "sans-serif" indicates a generic family (generic name) of the font.

"Dto:scalingjustify=bottom" constitutes information regarding the resizing processing, and indicates the line position to be set as the fixed position in the case where the size in the vertical direction is compressed by the resizing processing of the subtitle display position. In the illustrated example, it is illustrated that the line position to be set as the fixed position is the bottom line (lower line).

In addition, in the body, in association with the second subtitle position, the XML ID is indicated by "p2", the region ID is indicated by "r2", and text data of the subtitle is described. Here, the text data is set as "FGH". "font-family="monospaceSerif"" is the font specification information specifying the font of the p element. Here, the "monospaceSerif" indicates a generic family (generic name) of the font.

"dto:scalingjustify=top" constitutes information regarding the resizing processing, and indicates the line position to be set as the fixed position in the case where the size in the vertical direction is compressed by the resizing processing of the subtitle display position. In the illustrated example, it is illustrated that the line position to be set as the fixed position is the top line (upper line).

FIG. 6 illustrates a display example of the subtitle in a case where the aspect ratio of the video area is the same as the aspect ratio of the display video area (the video area displayed on the monitor). The illustrated example is a case where the aspect ratio of the video area is 16:9 and the aspect ratio of the monitor is also 16:9, and the TTML structure is as illustrated in FIG. 3 (one subtitle display position).

In the illustrated example, the video area is indicated by the broken line frame and the monitor area is indicated by the solid line frame. In this case, as indicated by the one-dot chain line frame, the display video area is set as the subtitle display range, and the subtitle display position (region) is determined on the basis of the subtitle display position information ("origin="OH % OV %"", "extent="EH % EV %"") specified as the relative positions with respect to the subtitle display range. "RP" indicates a reference point (Reference Pont) that is the top-left of the subtitle display range.

The subtitle "ABCDE" by the text data is displayed at the subtitle display position thus determined. Note that, in the illustrated example, the frames indicating the video area, the monitor area, and the subtitle display range are mutually displaced and displayed, but this is a procedure for clearly displaying each of the frames, and in reality, the frames overlap each other. Although the description is omitted, similar display is made in the following figures.

Figure 7:
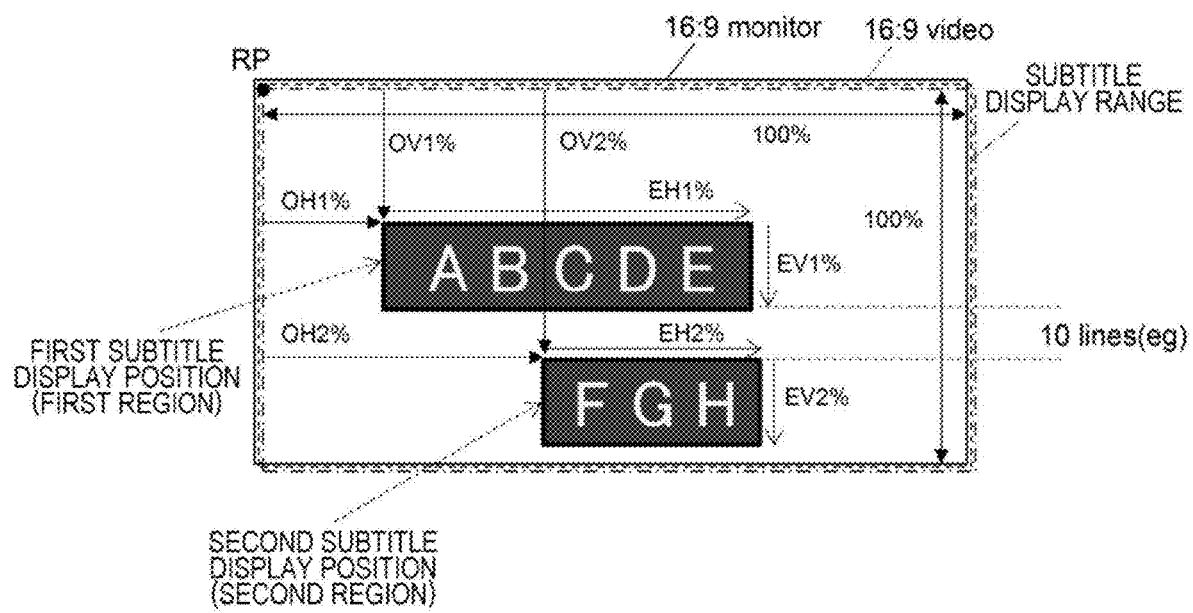
FIG. 7 is a diagram illustrating a display example (two subtitle display positions) of subtitles in the case where aspect ratio of the video area is the same as the aspect ratio of the display video area.

FIG. 7 also illustrates a display example of the subtitle in the case where the aspect ratio of the video area is the same as the aspect ratio of the display video area (the video area displayed on the monitor). The illustrated example is a case where the aspect ratio of the video area is 16:9 and the aspect ratio of the monitor is also 16:9, and the TTML structure is as illustrated in FIG. 5 (two subtitle display positions).

In the illustrated example, the video area is indicated by the broken line frame and the monitor area is indicated by the solid line frame. In this case, as indicated by the one-dot chain line frame, the display video area is set as the subtitle display range, and the first and second subtitle display positions (regions) are determined on the basis of the subtitle display position information ("origin="OH1% OV1%"", "extent="EH1% EV1%"", "origin="OH2% OV2%"", "extent="EH2% EV2%"") specified as the relative positions with respect to the subtitle display range.

Then, the subtitle "ABODE" by the text data is displayed in the first subtitle display position (first region), and the subtitle "FGH" by the text data is displayed in the second subtitle display position (second region). In this case, the interval between the two subtitle display positions (regions) is, for example, 10 lines.

Figure 8:
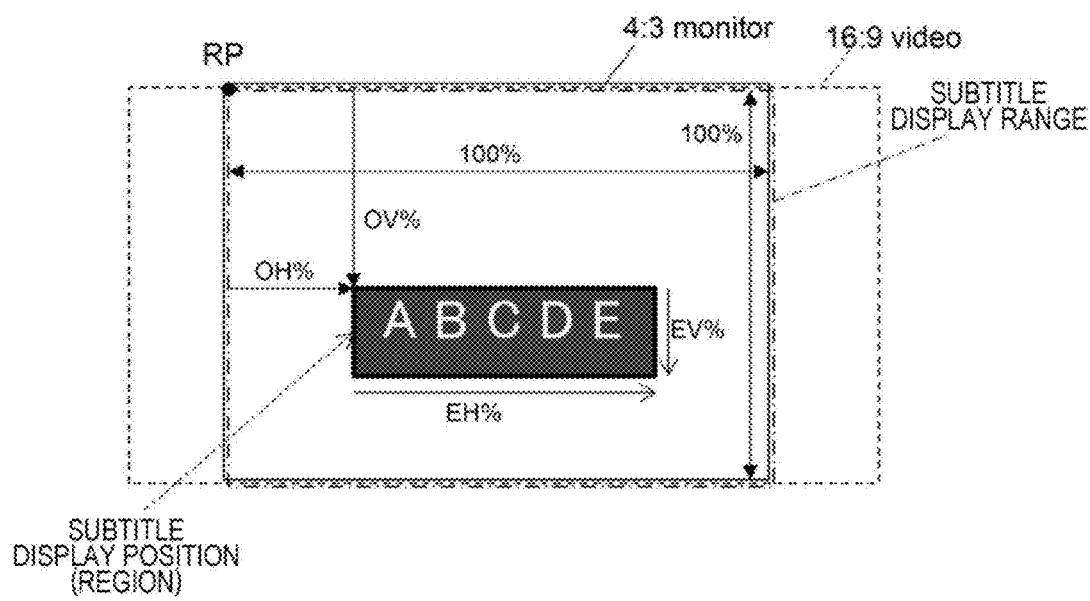
FIG. 8 is a diagram illustrating a display example of the subtitle (one subtitle display position) in a case where the aspect ratio of the video area is different from the aspect ratio of the display video area, the display video area is set as a subtitle display range, and the subtitle display position is determined on the basis of the subtitle display position information (a first method).

FIG. 8 illustrates a display example of the subtitle in the case where the aspect ratio of the video area is different from the aspect ratio of the display video area (the video area displayed on the monitor), the display video area is set as the subtitle display range, and the subtitle display position is determined on the basis of the subtitle display position information (the first method). The illustrated example is a case where the aspect ratio of the video area is 16:9 and the aspect ratio of the monitor is 4:3, and the TTML structure is as illustrated in FIG. 3 (one subtitle display position).

In the illustrated example, the video area is indicated by the broken line frame and the monitor area is indicated by the solid line frame. In this case, as indicated by the one-dot chain line frame, the display video area is set as the subtitle display range, and the subtitle display position (region) is determined on the basis of the subtitle display position information ("origin="OH % OV %"", "extent="EH % EV %"") specified as the relative positions with respect to the subtitle display range. Then, the subtitle "ABODE" by the text data is displayed in the subtitle display position.

In this case, as compared with the case of FIG. 6, the subtitle display position has the same width in the vertical direction, but its width is compressed in the horizontal direction. In this case, as the width of the subtitle display position is compressed, the font size of the subtitle is also adjusted to a smaller size. The font size of the subtitle is adjusted in this way, whereby the relationship is in a matched state between the subtitle display position and the subtitle displayed in the subtitle display position, in the horizontal direction, as illustrated in the figure; however, the relationship is in an unmatched state between the subtitle display position and the subtitle displayed in the subtitle display position, in the vertical direction in which the width of the subtitle display position is not compressed. In this case, a viewer receives a feeling that the black area at the subtitle display position floats.

Figure 9:
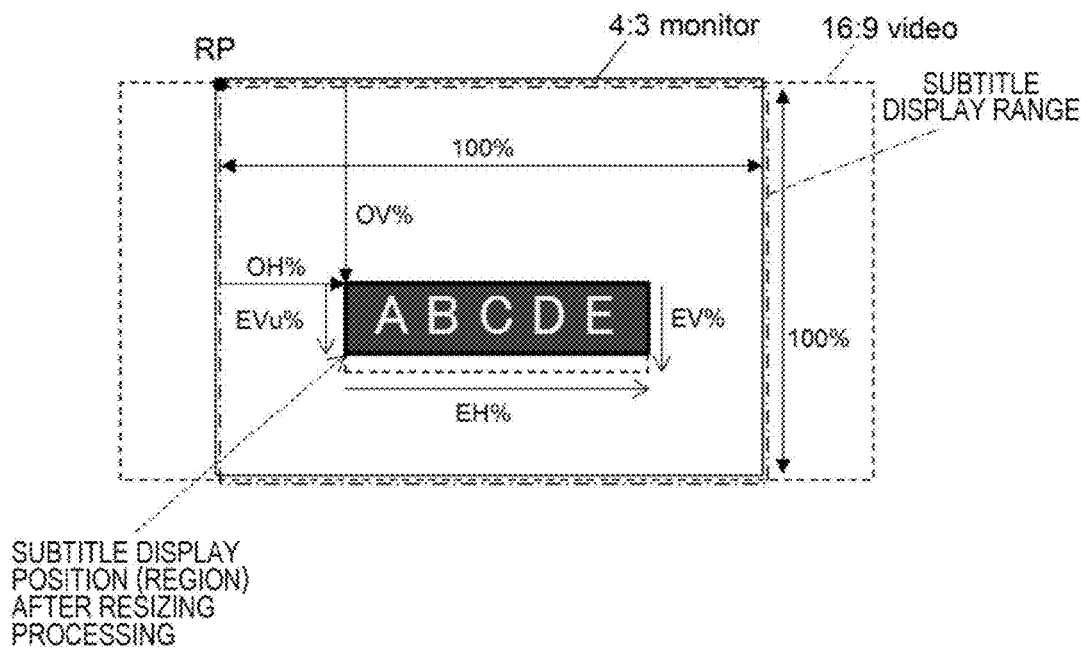
FIG. 9 is a diagram illustrating a display example in a case where resizing processing is performed.

In view of the above, in the first method, as described above, the resizing processing is performed on the subtitle display position determined, and the relationship is made to be in a matched state between the subtitle display position and the subtitle displayed on the subtitle display position not only in the horizontal direction but also in the vertical direction. FIG. 9 illustrates a display example in a case where the resizing processing is performed. In this case, by being determined on the basis of the subtitle display position information ("origin="OH % OV %"", "extent="EH % EV %"") by the resizing processing, the subtitle display position compressed only in the horizontal direction is compressed in the same proportion also in the vertical direction. In this case, as a result, the subtitle display position is determined by the subtitle display position information ("origin="OH % OV %"", "extent="EH % EVu %""). In this case, $EVu = \frac{3}{4} * EV$.

In a case where the resizing processing is performed in this way, compression of the width in the vertical direction is performed in a state where the predetermined line position is fixed. The illustrated example is a case where the predetermined line position is set as the top line (upper line) on the basis of the information of the "dto:scalingjustify=top" included in the TTML. Note that, in the illustrated example, the broken line frame indicates the subtitle display position before the compression is performed of the width in the vertical direction.

Figure 10:
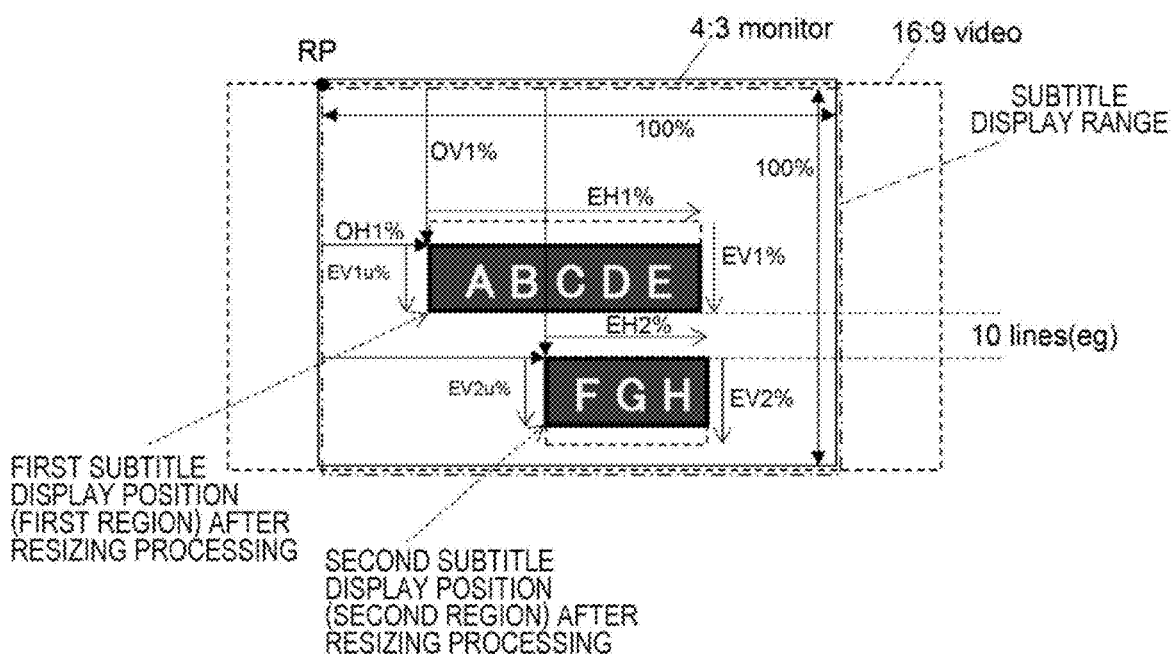
FIG. 10 is a diagram illustrating a display example of the subtitles (two subtitle display positions) in a case where the aspect ratio of the video area is different from the aspect ratio of the display video area, the display video area is set as the subtitle display range, and the subtitle display position is determined on the basis of the subtitle display position information, and the resizing processing is further performed (the first method).

FIG. 10 also illustrates a display example of the subtitles in the case where the aspect ratio of the video area is different from the aspect ratio of the display video area (the video area displayed on the monitor), the display video area is set as the subtitle display range, and the subtitle display position is determined on the basis of the subtitle display position information (the first method). The illustrated example is a display example in a case where the aspect ratio of the video area is 16:9 and the aspect ratio of the monitor is 4:3, and the TTML structure is as illustrated in FIG. 5 (two subtitle display positions), and the resizing processing is performed.

In the illustrated example, the video area is indicated by the broken line frame and the monitor area is indicated by the solid line frame. In this case, as indicated by the one-dot chain line frame, the display video area is set as the subtitle display range, and the first and second subtitle display positions (regions) are determined on the basis of the subtitle display position information ("origin="OH1% OV1%"", "extent="EH1% EV1%"", "origin="OH2% OV2%"", "extent="EH2% EV2%"") specified as the relative positions with respect to the subtitle display range, and then the resizing processing is further performed.

In this case, the first subtitle display position (first region) is determined by the subtitle display position information ("origin="OH1% OV1%"", "extent="EH1% EV1u %""), as a result. In this case, $EV1u = \frac{3}{4} * EV1$. Similarly, in this case, the second subtitle display position (second region) is determined by the subtitle display position information ("origin="OH2% OV2%"", "extent="EH2% EV2u %""), as a result. In this case, $EV2u = \frac{3}{4} * EV2$.

Then, the subtitle "ABCDE" by the text data is displayed in the first subtitle display position (first region), and the subtitle "FGH" by the text data is displayed in the second subtitle display position (second region). In this case, depending on the compression of the subtitle display position (region), the font size of the subtitle is adjusted so as to be matched with the subtitle display position compressed.

In a case where the resizing processing is performed, the compression of the width in the vertical direction is performed in a state where the predetermined line position is fixed. The illustrated example is a case where the predetermined line position is set as the bottom line (lower line) in the first subtitle display position (first region) on the basis of the information of the "dto:scalingjustify=bottom" included in the TTML. In addition, the example is a case where the predetermined line position is set as the top line (upper line) in the second subtitle display position (second region) on the basis of the information of the "dto:scalingjustify=top" included in the TTML.

The predetermined line positions are selected in the first and second subtitle display positions in this way, whereby, for example, 10 lines are maintained as the interval between the first and second subtitle display positions, similarly to the case in the display example of FIG. 7. For that reason, it becomes possible to substantially maintain perceptibility of the subtitles on the display image by the viewer.

Figure 11:
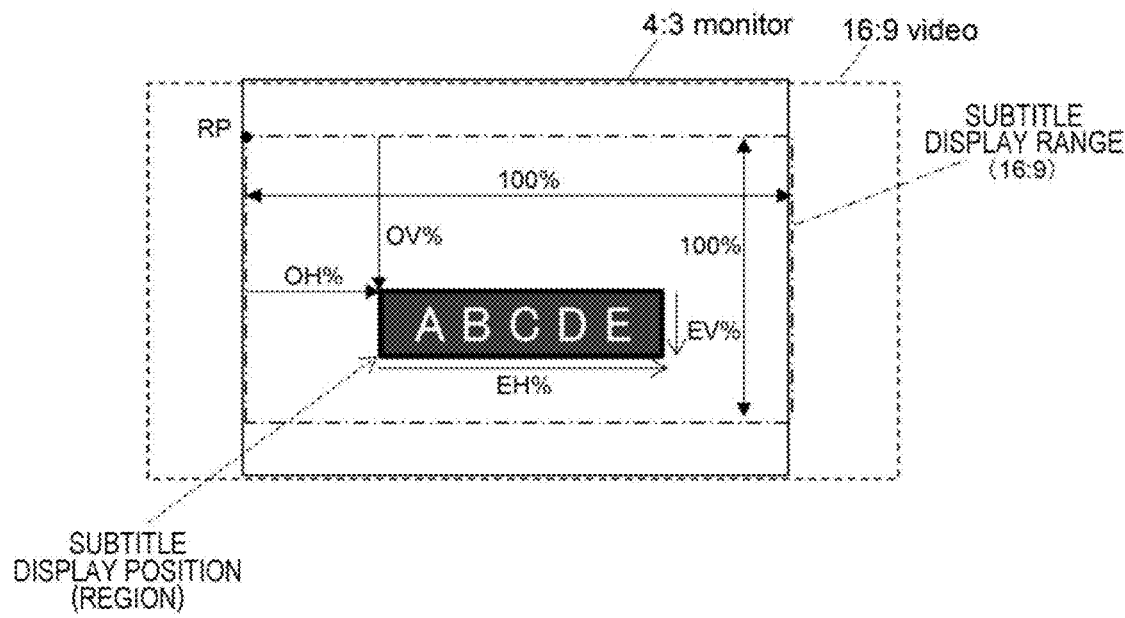
FIG. 11 is a diagram illustrating a display example of the subtitle (one subtitle display position) in a case where the aspect ratio of the video area is different from the aspect ratio of the display video area, the subtitle display range is set in the display video area, and the subtitle display position is determined on the basis of the subtitle display position information (a second method).

FIG. 11 illustrates a display example of the subtitle in the case where the aspect ratio of the video area is different from the aspect ratio of the display video area (the video area displayed on the monitor), the subtitle display range is set in the display video area, and the subtitle display position is determined on the basis of the subtitle display position information (a second method). The illustrated example is a display example in a case where the aspect ratio of the video area is 16:9 and the aspect ratio of the monitor is 4:3, and the TTML structure is as illustrated in FIG. 3 (one subtitle display position).

In the illustrated example, the video area is indicated by the broken line frame and the monitor area is indicated by the solid line frame. In this case, as indicated by the one-dot chain line frame, the subtitle display range is set in the display video area, and the subtitle display position (region) is determined on the basis of the subtitle display position information ("origin="OH % OV %"", "extent="EH % EV %"") specified as the relative positions with respect to the subtitle display range. Then, the subtitle "ABCDE" by the text data is displayed in the subtitle display position. In this case, depending on the compression of the subtitle display position (region), the font size of the subtitle is adjusted so as to be matched with the subtitle display position compressed.

In this case, for example, in the display video area, the subtitle display range is set having the same aspect ratio as the aspect ratio of the video area. The illustrated example is a case where the subtitle display range with aspect ratio of 16:9 is set in the display video area on the basis of the information on the subtitle display range included in the TTML, that is, the reference point information of the subtitle display range ("dto:RPoffset="Ax %, By %"") and the aspect ratio information of the subtitle display range ("dto:dispasp="16:9"").

In this case, the width of the subtitle display position is compressed in both the vertical direction and the horizontal direction, the shape of the subtitle display position is the same as in the case of FIG. 6, and the adjustment (resizing processing) becomes unnecessary of the font size of the subtitle due to the adjustment of the subtitle display position.

Figure 12:
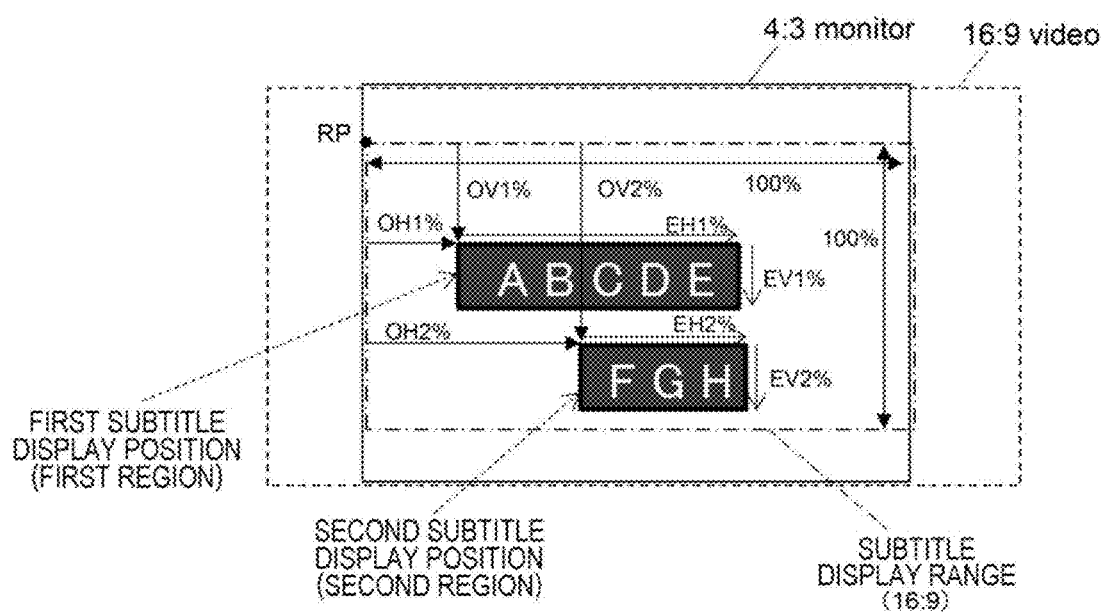
FIG. 12 is a diagram illustrating a display example of the subtitles (two subtitle display positions) in the case where the aspect ratio of the video area is different from the aspect ratio of the display video area, the subtitle display range is set in the display video area, and the subtitle display position is determined on the basis of the subtitle display position information (a second method).

FIG. 12 also illustrates a display example of the subtitle in the case where the aspect ratio of the video area is different from the aspect ratio of the display video area (the video area displayed on the monitor), the subtitle display range is set in the display video area, and the subtitle display position is determined on the basis of the subtitle display position information (a second method). The illustrated example is a display example in a case where the aspect ratio of the video area is 16:9 and the aspect ratio of the monitor is 4:3, and the TTML structure is as illustrated in FIG. 5 (two subtitle display positions).

In the illustrated example, the video area is indicated by the broken line frame and the monitor area is indicated by the solid line frame. In this case, as indicated by the one-dot chain line frame, the display video area is set as the subtitle display range, and the first and second subtitle display positions (regions) are determined on the basis of the subtitle display position information ("origin="OH1% OV1%"", "extent="EH1% EV1%"", "origin="OH2% OV2%"", "extent="EH2% EV2%"") specified as the relative positions with respect to the subtitle display range. Then, the subtitle "ABCDE" by the text data is displayed in the first subtitle display position (first region), and the subtitle "FGH" by the text data is displayed in the second subtitle display position (second region).

[Example Configuration of Stream Generation Unit of Broadcast Transmission System]

Figure 13:
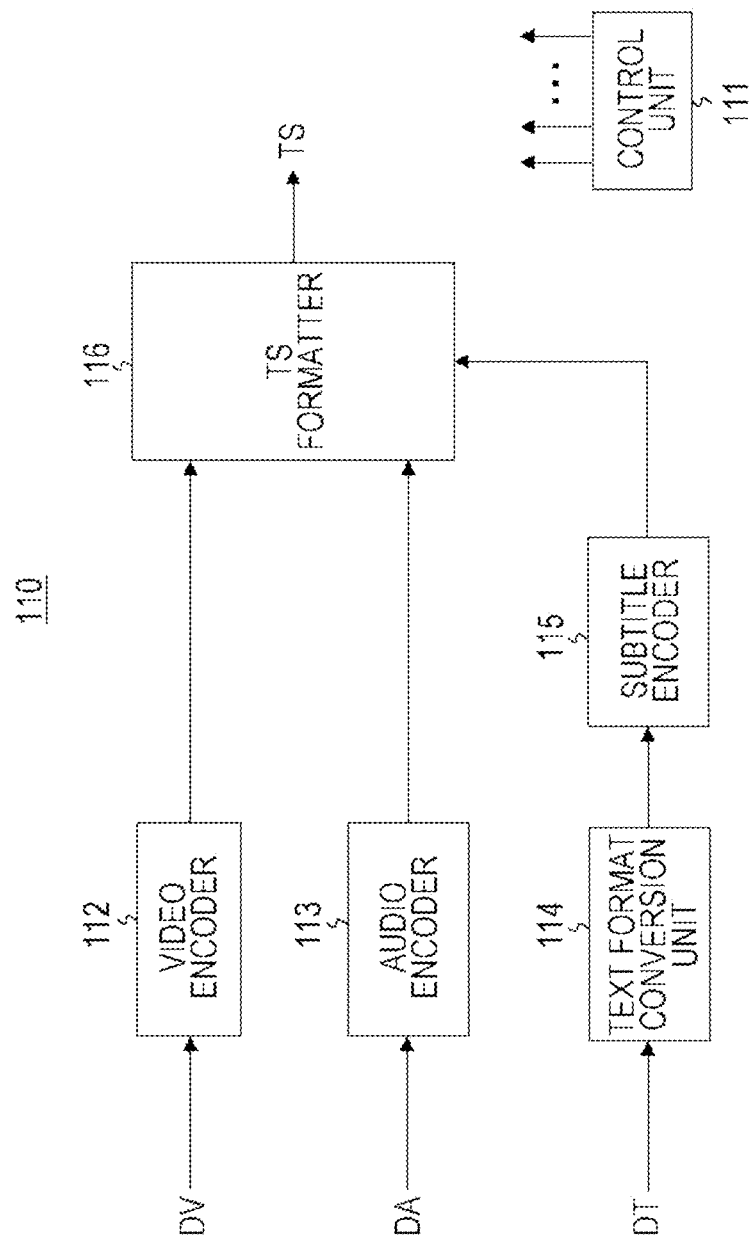
FIG. 13 is a block diagram illustrating an example configuration of a stream generation unit of a broadcast transmission system.

FIG. 13 illustrates an example configuration of a stream generation unit 110 of the broadcast transmission system 100. The stream generation unit 110 includes a control unit 111, a video encoder 112, an audio encoder 113, a text format conversion unit 114, a subtitle encoder 115, and a TS formatter (multiplexer) 116.

The control unit 111 is made to have a configuration including, for example, a Central Processing Unit (CPU), and controls operation of each unit of the stream generation unit 110. The video encoder 112 inputs video data DV, and performs encoding on the video data DV, to generate a video stream (PES stream) configured by a video PES packet including encoded video data in a payload. The audio encoder 113 inputs audio data DA, and performs encoding on the audio data DA, to generate an audio stream (PES stream) configured by an audio PES packet including encoded audio data.

The text format conversion unit 114 inputs text data (character code) DT and obtains the Timed Text Markup Language (TTML) as the subtitle information (see FIGS. 3 and 5). The TTML includes the subtitle display position information. In the subtitle display position information, the subtitle display position (region) is specified as the relative position (proportional value) with respect to the subtitle display range. In addition, the font specification information is included in the TTML.

In addition, the TTML includes the information regarding the resizing processing of the subtitle display position performed in the reception side in the case where the aspect ratio of the video area is different from the aspect ratio of the display video area, for example, the information indicating the line position to be set as the fixed position in the case where the size in the vertical direction is compressed in the resizing processing of the subtitle display position. In addition, the TTML includes the information for determining the subtitle display range (reference point information and aspect ratio information of the subtitle display range).

The subtitle encoder 115 converts the TTML obtained by the text format conversion unit 114 into various segments, and generates a subtitle stream (PES stream) configured by a subtitle PES packet in which those segments are arranged in the payload.

In this case, the subtitle encoder 115 inserts, into the PES packet, the information regarding the resizing processing and the information for determining the subtitle display range that are similar to those included in the TTML. Specifically, a newly defined TTML display segment (TTML_display_segment) including those pieces of information is generated and the segment is inserted into the PES packet.

In addition, the subtitle encoder 115 inserts, into the PES packet, the download information for downloading the file of the font specified by at least the font specification information of the TTML. Specifically, a newly defined font download segment (Font_download_segment) including information for downloading from the broadcast signal (transport stream TS) and a newly defined URL signaling segment (URL_signaling_segment) including information for downloading from the server on the network are generated, and those segments are inserted into the PES packet.

FIG. 14(a) illustrates an example structure (Syntax) of the subtitle PES packet (PES_packet). In a 24-bit field of "PES_startcode_prefix", a fixed pattern of "0x000001" is arranged. An 8-bit field of "stream_id" indicates a stream identifier. In the case of the subtitle PES packet, it is set to "10111101" that is a value indicating "private stream1. A 16-bit field of "PES_packet_length" indicates the number of subsequent bytes as the length (size) of the PES packet.

After the "PES_packet_length", a field exists of "Optional_PES_header( )". In the field, time stamps of PTS and DTS, and the like are arranged. After the field, a field exists of "PES_packet_data_byte". The field corresponds to a PES payload. In the field, "PES_data_byte_field( )" for containing data is arranged.

FIG. 14(b) illustrates an example structure (Syntax) of the "PES_data_byte_field( )". An 8-bit field of "data_identifier" is the container portion and indicates an identifier for identifying the type of data. Since the conventional subtitle (in the case of bitmap) is supposed to be indicated by "0x20", in the case of text, the subtitle can be identified with a new value, for example "0x21".

An 8-bit field of "subtitle_stream_id" indicates an identifier for identifying the type of the subtitle stream. In the case of a subtitle stream that transmits text information, a new value is set, for example, "0x01", and it is possible to distinguish the value from the conventional subtitle stream "0x00" that transmits the bitmap.

After the field of the "subtitle_stream_id", a field exists of "TimedTextSubtitling_segments( )" following the pattern of "00001111". A segment packet is arranged in the field. After the field, an 8-bit field exists of "end_of_PES_data_field_marker". The field is a marker indicating the end of the PES packet.

FIG. 15 illustrates an example of a definition of a segment type (segment_type). "0xA0" indicates that it is a segment that transmits the entire TTML document. "0xA1" indicates that it is a segment that transmits the <tt> portion. "0xA2" indicates that it is a segment that transmits the <head> portion. "0xA3" indicates that it is a segment packet that transmits the <body> portion. "0xA4" indicates that it is the TTML display segment. "0xA5" indicates that it is the font download segment. "0xA6" indicates that it is the URL signaling segment.

FIG. 16 illustrates an example structure (Syntax) of the TTML display segment (TTML_display_segment). FIG. 17 illustrates details of main information (Semantics) in the example structure. An 8-bit field of "sync_byte" is a unique word indicating the start of the segment. An 8-bit field of "segment_type" indicates the type of the segment. In the case of the TTML display segment, the "segment_type" is set to "0xA4" (see FIG. 15), and indicates that it is the TTML display segment. A 16-bit field of "segment_length" indicates the number of subsequent bytes as the length (size) of the TTML display segment.

A 4-bit field of "tds_version_number" indicates updating of the TTML display segment. In a case where there is a change in the element, the value is increased by one. An 8-bit field of "display_aspect_type" indicates the aspect ratio of the subtitle display range. For example, "0x01" indicates 16:9, "0x02" indicates 4:3, and "0x03" indicates 21:9. Information of the field corresponds to the information of the "dto:dispasp" in the TTML (see FIGS. 3 and 5).

An 8-bit field of "reference_point_offset_v" indicates a vertical position of the reference point of the subtitle display range of when each of the vertical and horizontal ranges of the display video area is set to 100%, as a ratio of an offset from the top-left of the display video area. An 8-bit field of "reference_point_offset_h" indicates a horizontal position of the reference point of the subtitle display range of when each of the vertical and horizontal ranges of the display video area is set to 100%, as a ratio of an offset from the top-left of the display video area. The information of these fields corresponds to information of the "dto:RPoffset" in the TTML (see FIGS. 3 and 5).

A 1-bit field of "scaling_justify_flag" indicates whether or not to specify a reference point of scaling in a case where scaling of the region is performed. "1" indicates that the reference point is specified, and "0" indicates that no reference point is specified. In a case where the reference point is specified, when there is a plurality of regions, for a region at the uppermost position, the lower part of the region is set as a reference (bottom_line_justified), and for a region at the lowermost position, the upper part of the region is set as a reference (top_line_justified). Information of the field corresponds to the information of the "dto:scalingjustify" in the TTML (see FIGS. 3 and 5).

FIG. 18 illustrates an example structure (Syntax) of the font download segment (Font_download_segment). FIG. 19 illustrates details of main information (Semantics) in the example structure. An 8-bit field of "sync_byte" is a unique word indicating the start of the segment. An 8-bit field of "segment_type" indicates the type of the segment. In the case of the font download segment, the "segment_type" is set to "0xA5" (see FIG. 15), and indicates that it is the font download segment. A 16-bit field of "segment_length" indicates the number of subsequent bytes as the length (size) of the font download segment. A 4-bit field of "fds_version_number" indicates updating of the font download segment. In a case where there is a change in the element, the value is increased by one.

A 16-bit field of "original_network_id" indicates identification information of the network through which the download data is transmitted. A 16-bit field of "transport_stream_id" indicates identification information of an individual transport stream. A 16-bit field of "service_id" indicates identification information of the service to be downloaded. In the case of a common download target between distribution media, the font file may be transmitted not in its own transport stream but in another transport stream, and as information for specifying a private section to be referenced in that case, information can be specified of these "original_network_id", "transport_stream_id", and "service_id".

An 8-bit field of "font_file_id" indicates an identification number assigned to the font file. A 24-bit field of "ISO_639_language_code" indicates a code including three characters for identifying the language. For example, "jpn" indicates Japanese and "eng" indicates English. An 8-bit field of "font_group_id" indicates identification information of a font group and corresponds to the generic family of the TTML. An 8-bit field of "font_name_id" indicates the individual font name.

An 8-bit field of "text_length" indicates the length (size) of the subsequent character code portion in bytes. The character code is arranged in the field of "char". For example, it is possible to arrange a character code indicating the individual font name or the like as the character code.

Note that, in the example of FIG. 18, download information of one font file is included, but it is also possible to include download information of a plurality of font files. In that case, the structure has a for loop in which the fields from the "original_network_id" is repeated. Alternatively, it is also possible to supply the download information of the plurality of font files by transmitting a plurality of the font download segments (Font_download_segment).

FIG. 20 illustrates an example structure (Syntax) of the URL signaling segment (URL_signaling_segment). FIG. 21 illustrates details of main information (Semantics) in the example structure. An 8-bit field of "sync_byte" is a unique word indicating the start of the segment. An 8-bit field of "segment_type" indicates the type of the segment. In the case of the URL signaling segment, the "segment_type" is set to "0xA6" (see FIG. 15), and indicates that it is the URL signaling segment. A 16-bit field of "segment_length" indicates the number of subsequent bytes as the length (size) of the font download segment. A 4-bit field of "uss_version_number" indicates updating of the URL signaling segment. In a case where there is a change in the element, the value is increased by one.

A 24-bit field of "ISO_639_language_code" indicates a code including three characters for identifying the language. For example, "jpn" indicates Japanese and "eng" indicates English. An 8-bit field of "font_group_id" indicates identification information of a font group and corresponds to the generic family of the TTML. An 8-bit field of "font_name_id" indicates the individual font name.

An 8-bit field of "url_type" indicates the type of the server. For example, "0x01" indicates a font server (uncompressed URL), "0x02" indicates a general server (uncompressed URL), "0x11" indicates a font server (compressed URL), and "0x12" indicates a general server (compressed URL). An 8-bit field of "url_string_length" indicates the length (size) of the character code portion indicating the character string of the subsequent URL in bytes. The character code is arranged in the field of "char".

Note that, in the example of FIG. 20, download information of one font file is included, but it is also possible to include download information of a plurality of font files. In that case, the structure has a for loop in which the fields from the "ISO_639_language_code" is repeated. Alternatively, it is also possible to supply the download information of the plurality of font files by transmitting a plurality of the URL signaling segments (URL_signaling_segment).

Referring back to FIG. 13, the TS formatter 116 makes the video stream generated by the video encoder 112, the audio stream generated by the audio encoder 113, and the subtitle stream generated by the subtitle encoder 115 into a transport packet to multiplex them, to obtain the transport stream TS as the container (multiplexed stream).

In this case, the TS formatter 116 inserts, into the Program Map Table (PMT), the information regarding the resizing processing and the information for determining the subtitle display range that are similar to those included in the TTML. Specifically, a newly defined TTML display descriptor (TTML_display_descriptor) including those pieces of information is generated and the descriptor is inserted into the PMT.

In addition, the TS formatter 116 inserts, into the PMT, the download information for downloading the file of the font specified by at least the font specification information of the TTML. Specifically, a newly defined font download descriptor (Font_download_descriptor) including information for downloading from the broadcast signal (transport stream TS) and a newly defined URL signaling descriptor (URL_signaling_descriptor) including information for downloading from the server on the network are generated, and those descriptors are inserted into the PMT.

FIG. 22 illustrates an example structure (Syntax) of the TTML display descriptor (TTML_display_descriptor). An 8-bit field of "descriptor_tag" indicates a descriptor type, and here, indicates that it is the TTML display descriptor. An 8-bit field of "descriptor_length" indicates the length (size) of the descriptor, and indicates the number of subsequent bytes as the length of the descriptor.

An 8-bit field of "display_aspect_type" indicates the aspect ratio of the subtitle display range. Information of the field corresponds to the information of the "dto:dispasp" in the TTML (see FIGS. 3 and 5).

An 8-bit field of "reference_point_offset_v" indicates a vertical position of the reference point of the subtitle display range of when each of the vertical and horizontal ranges of the display video area is set to 100%, as a ratio of an offset from the top-left of the display video area. An 8-bit field of "reference_point_offset_h" indicates a horizontal position of the reference point of the subtitle display range of when each of the vertical and horizontal ranges of the display video area is set to 100%, as a ratio of an offset from the top-left of the display video area.

The information of these fields corresponds to information of the "dto:RPoffset" in the TTML (see FIGS. 3 and 5).

A 1-bit field of "scaling_justify_flag" indicates whether or not to specify a reference point of scaling in a case where scaling of the region is performed. "1" indicates that the reference point is specified, and "0" indicates that no reference point is specified. Information of the field corresponds to the information of the "dto:scalingjustify" in the TTML (see FIGS. 3 and 5).

An 8-bit field of "text_length" indicates the length (size) of the subsequent character code portion in bytes. The character code is arranged in the field of "char". For example, it is possible to arrange a character code indicating the aspect ratio or the like as the character code.

FIG. 23 illustrates an example structure (Syntax) of the font download descriptor (Font_download_descriptor). An 8-bit field of "descriptor_tag" indicates a descriptor type, and here, indicates that it is the font download descriptor. An 8-bit field of "descriptor_length" indicates the length (size) of the descriptor, and indicates the number of subsequent bytes as the length of the descriptor.

A 16-bit field of "original_network_id" indicates identification information of the network through which the download data is transmitted. A 16-bit field of "transport_stream_id" indicates identification information of an individual transport stream. A 16-bit field of "service_id" indicates identification information of the service to be downloaded. In the case of a common download target between distribution media, the font file may be transmitted not in its own transport stream but in another transport stream, and as information for specifying a private section to be referenced in that case, information can be specified of these "original_network_id", "transport_stream_id", and "service_id".

An 8-bit field of "font_file_id" indicates an identification number assigned to the font file. A 24-bit field of "ISO_639_language_code" indicates a code including three characters for identifying the language. An 8-bit field of "font_group_id" indicates identification information of a font group and corresponds to the generic family of the TTML. An 8-bit field of "font_name_id" indicates the individual font name.

An 8-bit field of "text_length" indicates the length (size) of the subsequent character code portion in bytes. The character code is arranged in the field of "char". For example, it is possible to arrange a character code indicating the individual font name or the like as the character code.

Note that, in the example of FIG. 23, download information of one font file is included, but it is also possible to include download information of a plurality of font files. In that case, the structure has a for loop in which the fields from the "original_network_id" is repeated.

FIG. 24 illustrates an example structure (Syntax) of the font download descriptor (Font_download_descriptor). An 8-bit field of "descriptor_tag" indicates a descriptor type, and here, indicates that it is the font download descriptor. An 8-bit field of "descriptor_length" indicates the length (size) of the descriptor, and indicates the number of subsequent bytes as the length of the descriptor.

A 24-bit field of "ISO_639_language_code" indicates a code including three characters for identifying the language. An 8-bit field of "font_group_id" indicates identification information of a font group and corresponds to the generic family of the TTML. An 8-bit field of "font_name_id" indicates the individual font name. An 8-bit field of "url_type" indicates the type of the server. An 8-bit field of "url_string_length" indicates the length (size) of the character code portion indicating the character string of the subsequent URL in bytes. The character code is arranged in the field of "char".

Note that, in the example of FIG. 24, download information of one font file is included, but it is also possible to include download information of a plurality of font files. In that case, the structure has a for loop in which the fields from the "ISO_639_language_code" is repeated.

As described above, on the basis of the information included in the font download segment (see FIG. 18) inserted into the PES packet or the font download descriptor (see FIG. 23) inserted into the PMT, the television receiver 200 can acquire the file of the font specified by the font specification information of the TTML from the transport stream TS (broadcast signal) as illustrated as "Font download case (Case 1)" in FIG. 25(a).

In addition, as described above, on the basis of the information included in the URL signaling segment (see FIG. 20) inserted into the PES packet or the font download descriptor (see FIG. 24) inserted into the PMT, the television receiver 200 can acquire the file of the font specified by the font specification information of the TTML from the server on the network as illustrated as "Font download case (Case 2)" in FIG. 25(b).

Referring back to FIG. 13, the TS formatter 116 sequentially and repeatedly inserts the predetermined number of section tables respectively including different font files (Font files) into the transport stream TS. That is, the broadcast transmission system 100 repeatedly transmits the predetermined number of section tables by the data carousel.

FIG. 26 schematically illustrates that one section table including a font table (Font Table) is repeatedly transmitted by the data carousel in addition to N section tables each including a font file (Font file), and the receiver 200 can receive these section tables without being limited in its timing.

Here, as the section table including the font file and the font table, a font downloading section table (FDT) (Font_downloading_section table) is newly defined as a private section table. In the font downloading section table, although the table structure is described later, fields exist such as "data_downloading_id", "section_number", and "last_section_number".

As illustrated in FIG. 26, for example, values from 0 to N are inserted into the field of the "data_downloading_id" of the font downloading section table circulating, and each section table can be identified. Values similar to those of the field of the "data_downloading_id" are inserted also into the field of the "section_number" of the font downloading section table circulating, and the value of N is inserted into the field of the "last_section_number" of each section table.

The receiver 200 can recognize a positional relationship during circular supply with the values of the fields of the "section_number" and "last_section_number" of the font downloading section table received. That is, the receiver 200 recognizes a position of the current section table with the value of the field of the "section_number", recognizes the last section table circulating when the value of the field of the "section_number" coincides with the value of the field of the "last_section_number", and can use the values to acquire all the section tables in one circulation.

FIG. 27 illustrates an example structure (Syntax) of the font downloading section table (Font_downloading_section table). FIG. 28 illustrates details of main information (Semantics) in the example structure.

An 8-bit field of "table_id" indicates table identification information. A value indicating the font downloading section table is specified as the table identification information. A 16-bit field of "data_downloading_id" is identification information of the download data and indicates a unique value defined for each "original_network_id". For example, "0x00" indicates that it is font table information, and other than "0x00" indicates that it is font file information. A 5-bit field "version_number" indicates updating of the font downloading section table. In a case where there is a change in the element, the value is increased by one.

A 16-bit field of "original_network_id" indicates identification information of the network through which the download data is transmitted. A 16-bit field of "transport_stream_id" indicates identification information of an individual transport stream. A 16-bit field of "service_id" indicates identification information of the service to be downloaded. By using these three pieces of identification information together, it becomes possible to make it a common download target between distribution media.

In a field of "descriptor( )", a font table descriptor (Font_table_descriptor) is arranged when the "data_downloading_id" is "0x00", and a font file descriptor (Font_file_descriptor) is arranged when the "data_downloading_id" is other than "0x00". In addition, when the "data_downloading_id" is other than "0x00", a font file (Font file) is arranged in the field of "data_byte".

FIG. 29 schematically illustrates the font table information described in the font downloading section table when the "data_downloading_id" is "0x00". In this case, as described above, the font table descriptor (Font_table_descriptor) is arranged in the field of the "descriptor( )" in the font downloading section table.

In the font table descriptor, information is described on a predetermined number of font files to be circularly transmitted. As the information on the font file, pieces of information are included such as "Font_file_id", "ISO_639_language_code", "font_group_id", and "font_name_id". The "Font_file_id" indicates an identification number assigned to the font file. The "ISO_639_language_code" indicates an identification code of the language. The "font_group_id" indicates identification information of a font group. The "font_name_id" indicates an individual font name. FIG. 30 illustrates a correspondence between a value of the "font_group_id" and the font group.

FIG. 31 illustrates an example structure (Syntax) of the font table descriptor (Font_table_descriptor). An 8-bit field of "descriptor_tag" indicates a descriptor type, and here, indicates that it is the font table descriptor. An 8-bit field of "descriptor_length" indicates the length (size) of the descriptor, and indicates the number of subsequent bytes as the length of the descriptor.

An 8-bit field of "number of font files" indicates the number of font files. There are 8-bit fields of "font_file_id", 24-bit fields of "ISO_639_language_code", 8-bit fields of "font_group_id", and 8-bit fields of "font_name_id", as many as the number of font files.

An 8-bit field of "text_length" indicates the length (size) of the subsequent character code portion in bytes. The character code is arranged in the field of "char". For example, it is possible to arrange a character code indicating the individual font name or the like as the character code.

Figure 32:
FIG. 32 is a diagram schematically illustrating font table information described in the font downloading section table when "data_downloading_id" is other than "0x00".

FIG. 32 schematically illustrates the font table information described in the font downloading section table when the "data_downloading_id" is other than "0x00". In this case, as described above, in the font downloading section table, the font file descriptor (Font_file_descriptor) is arranged in the field of the "descriptor( )", and further the font file (Font file) is arranged in the field of the "data_byte".

Information on the font file to be transmitted is described in the font file descriptor. As the information on the font file, pieces of information are included such as "Font_file_id", "ISO_639_language_code", "font_group_id", and "font_name_id". The "Font_file_id" indicates an identification number assigned to the font file. The "ISO_639_language_code" indicates an identification code of the language. The "font_group_id" indicates identification information of a font group. The "font_name_id" indicates an individual font name.

FIG. 33 illustrates an example structure (Syntax) of the font file descriptor (Font_file_descriptor). An 8-bit field of "descriptor_tag" indicates a descriptor type, and here, indicates that it is the font file descriptor. An 8-bit field of "descriptor_length" indicates the length (size) of the descriptor, and indicates the number of subsequent bytes as the length of the descriptor.

There are an 8-bit field of "Font_file_id", a 24-bit field of "ISO_639_language_code", an 8-bit field of "font_group_id", and an 8-bit field of "font_name_id" indicating the information on the font file to be transmitted. An 8-bit field of "text_length" indicates the length (size) of the subsequent character code portion in bytes. The character code is arranged in the field of "char". For example, it is possible to arrange a character code indicating the individual font name or the like as the character code.

Operation of the stream generation unit 110 illustrated in FIG. 13 is briefly described. The video data DV is supplied to the video encoder 112. The video encoder 112 performs encoding on the video data DV to generate the video stream (PES stream) configured by the video PES packet including the encoded image data in the payload. The video stream is supplied to the TS formatter 116.

In addition, the audio data DA is supplied to the audio encoder 113. The audio encoder 113 performs encoding on the audio data DA to generate the audio stream (PES stream) including the audio PES packet including the encoded audio data. The audio stream is supplied to the TS formatter 116.

In addition, the text data (character code) DT is supplied to the text format conversion unit 114. In the text format conversion unit 114, the TTML as the subtitle information is obtained (see FIGS. 3 and 5). The TTML includes the subtitle display position information for specifying the subtitle display position (region) as the relative position (proportional value) with respect to the subtitle display range. In addition, the font specification information is included in the TTML. In addition, the TTML includes the auxiliary information (information regarding the resizing processing, information for determining the subtitle display range) to be used when the subtitle is displayed by using the subtitle display position information.

The TTML is supplied to the subtitle encoder 115. The subtitle encoder 115 converts the TTML into various segments to generate the subtitle stream configured by the subtitle PES packet in which those segments are arranged in the payload. The subtitle stream is supplied to the TS formatter 116.

In this case, the subtitle encoder 115 inserts, into the PES packet, auxiliary information (information regarding the resizing processing, information for determining the subtitle display range) to be used when the subtitle is displayed by using the subtitle display position information, the auxiliary information being similar to that included in the TTML. Specifically, the TTML display segment (see FIG. 16) including those pieces of information is generated, and the segment is inserted into the PES packet.

In addition, the subtitle encoder 115 inserts, into the PES packet, the download information for downloading the file of the font specified by at least the font specification information of the TTML. Specifically, the font download segment (see FIG. 18) including information for downloading from the broadcast signal (transport stream TS) and the URL signaling segment (see FIG. 20) including information for downloading from the server on the network are generated, and those segments are inserted into the PES packet.

The TS formatter 116 makes the video stream generated by the video encoder 112, the audio stream generated by the audio encoder 113, and the subtitle stream generated by the subtitle encoder 115 into a transport packet to multiplex them, to generate the transport stream TS as the container (multiplexed stream)

In this case, the TS formatter 116 inserts, into the PMT, auxiliary information (information regarding the resizing processing, information for determining the subtitle display range) to be used when the subtitle is displayed by using the subtitle display position information, the auxiliary information being similar to that included in the TTML. Specifically, the TTML display descriptor (see FIG. 22) including those pieces of information is generated, and the descriptor is inserted into the PMT.

In addition, the TS formatter 116 inserts, into the PMT, the download information for downloading the file of the font specified by at least the font specification information of the TTML. Specifically, the font download descriptor (see FIG. 23) including information for downloading from the broadcast signal (transport stream TS) and the newly defined URL signaling descriptor (see FIG. 24) including information for downloading from the server on the network are generated, and those descriptors are inserted into the PMT.

[Example Configuration of Transport Stream TS]

Figure 34:
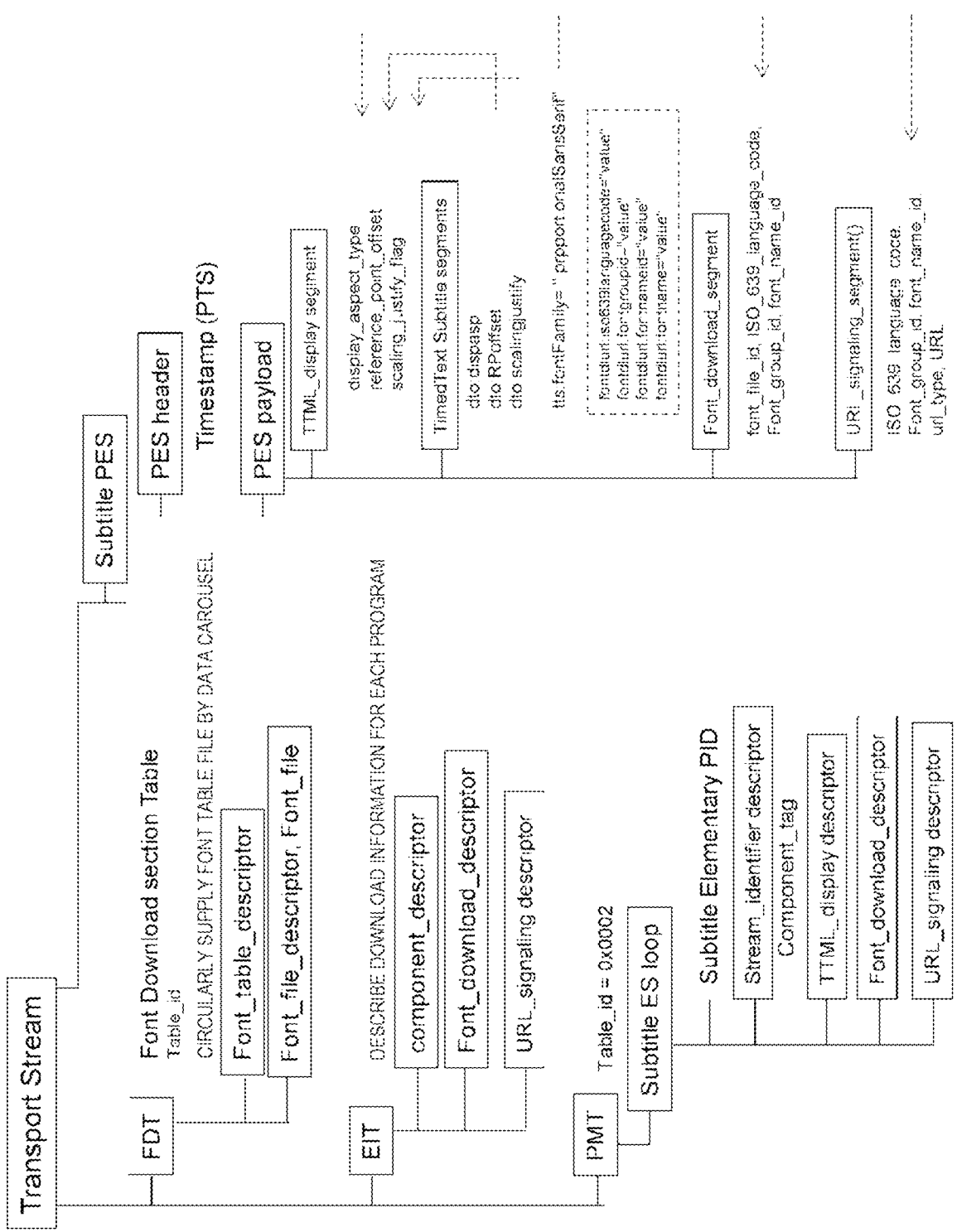
FIG. 34 is a diagram illustrating an example configuration of the transport stream TS.

FIG. 34 illustrates an example configuration of the transport stream TS. In the example configuration, configurations of video and audio portions are omitted. In the example configuration, a subtitle PES packet "Subtitle PES" exists being a PES packet of a subtitle stream.

In the subtitle PES packet, the time stamp of the PTS is inserted into the PES header, and the entire TTML document or segments (timed text subtitling segments: TimedText subtitle segments) including divided portions of the TTML document are inserted into the PES payload. The segments include the information regarding the resizing processing ("dto:scalingjustify"), and the information for determining the subtitle display range ("dto:dispasp", "dto:RPoffset").

In addition, the segments include the font specification information ("fontFamily"). Note that, as described later, it is also conceivable to include, in the segments, the download information ("fontdlurl=http://www.w3.org/ns/fontdlservice", "fontdlurl:iso639languagecode="value"", "fontdlurl:fontgroupid="value"", "fontdlurl:fontnameid="value"", "fontdlurl:fontname="value"".

In addition, the TTML display segment (TTML_display_segment) (see FIG. 16) is inserted into the PES payload of the subtitle PES packet. Into the segment, the information regarding the resizing processing ("scaling_justify_flag") and the information for determining the subtitle display range ("display_aspect_type", "reference_point_offset_v, reference_point_offset_h") are inserted respectively corresponding to the information regarding the resizing processing ("dto:scalingjustify") and the information for determining the subtitle display range ("dto:dispasp", "dto:RPoffset") included in the above-described timed text subtitling segments (TimedText subtitle segments).

In addition, the font download segment (Font_download_segment) (see FIG. 18) is inserted into the PES payload of the subtitle PES packet. Into the segment, the information ("font_file_id", "ISO_639_language_code", "font_group_id", "font_name_id", and the like) is inserted for downloading, from the broadcast signal (transport stream TS), the file of the font specified by the font specification information ("fontFamily") included in the above-described timed text subtitling segments (TimedText subtitle segments).

In addition, the URL signaling segment (URL_signalin_segment) (see FIG. 20) is inserted into the PES payload of the subtitle PES packet. Into the segment, the information ("ISO_639_language_code", "font_group_id", "font_name_id", "url_type", "URL", and the like) is inserted for downloading, from the server on the network, the file of the font specified by the font specification information ("fontFamily") included in the above-described timed text subtitling segments (TimedText subtitle segments).

In addition, the transport stream TS includes the Program Map Table (PMT) as Program Specific Information (PSI). The PSI is information describing which program each elementary stream included in the transport stream TS belongs to. In the PMT, a subtitle elementary stream loop (Subtitle ES loop) exists including information associated with the subtitle stream.

In the subtitle elementary stream loop, information such as a packet identifier (PID) is arranged corresponding to the subtitle stream, and a descriptor is also arranged describing information associated with the subtitle stream. As the descriptor, the TTML display descriptor (TTML_display_descriptor) (see FIG. 22), the font download descriptor (Font_download_descriptor) (see FIG. 23), and the URL signaling descriptor (URL_signaling_descriptor) (see FIG. 24) are arranged.

Into the TTML_display_descriptor, the information regarding the resizing processing ("scaling_justify_flag"), and the information for determining the subtitle display range ("display_aspect_type", "reference_point_offset_v, reference_point_offset_h") are inserted. Into the font download descriptor, the download information ("font_file_id", "ISO_639_language_code", "font_group_id", "font_name_id", and the like) is inserted similar to that of the font download segment. Into the URL signaling descriptor, the download information ("ISO_639_language_code", "font_group_id", "font_name_id", "url_type", "URL", and the like) is inserted similar to that of the URL signaling segment.

Note that, the font download descriptor and the URL signaling descriptor may be arranged under an Event Information Table (EIT) of the transport stream TS. This makes it possible to describe the download information for each program.

In addition, the transport stream TS includes the FDT (Font_downloading_section table) (see FIG. 27)). With the FDT, the font table file is circularly supplied by the data carousel. Into the FDT, the font table descriptor (Font_table_descriptor) (see FIG. 31), or the font file descriptor (Font_file_descriptor) (see FIG. 33) and the font file (Font_file) are inserted. Note that, there may be a case where the FDT does not exist in the transport stream TS. In that case, in a case where the font file is downloaded on the basis of the download information included in the font download segment of the PES packet or the font download descriptor of the PMT, the receiver 200 downloads the font file from another transport stream TS.

[Example Configuration of Television Receiver]

Figure 35:
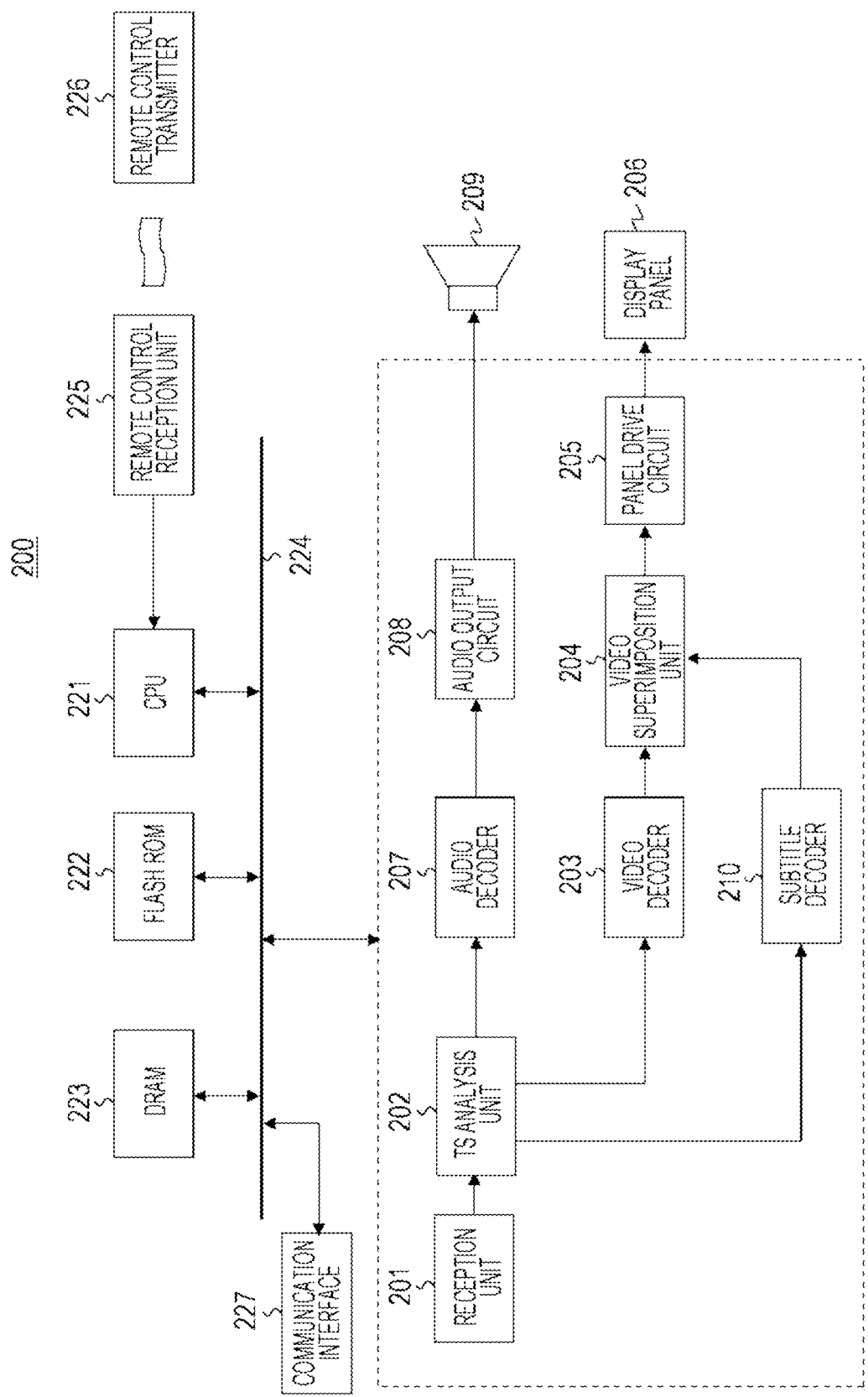
FIG. 35 is a block diagram illustrating an example configuration of a television receiver.

FIG. 35 illustrates an example configuration of the television receiver 200. The television receiver 200 includes a reception unit 201, a TS analysis unit (demultiplexer) 202, a video decoder 203, a video superimposition unit 204, a panel drive circuit 205, and a display panel 206 as a monitor (display). In addition, the television receiver 200 includes an audio decoder 207, an audio output circuit 208, a speaker 209, and a subtitle decoder 210. In addition, the television receiver 200 includes a CPU 221, flash ROM 222, DRAM 223, an internal bus 224, a remote control reception unit 225, a remote control transmitter 226, and a communication interface 227.

The CPU 221 controls operation of each unit of the television receiver 200. The flash ROM 222 stores control software and keeps data. The DRAM 223 configures a work area of the CPU 221. The CPU 221 deploys the software and the data read from the flash ROM 222 on the DRAM 223 to start the software, and controls each unit of the television receiver 200.

The remote control reception unit 225 receives a remote control signal (remote control code) transmitted from the remote control transmitter 226, and supplies the signal to the CPU 221. The CPU 221 controls each unit of the television receiver 200 on the basis of the remote control code. The CPU 221, the flash ROM 222, and the DRAM 223 are connected to the internal bus 224.

Under the control of the CPU 221, the communication interface 227 communicates with a server existing on a network such as the Internet. The communication interface 227 is connected to the internal bus 224.

The reception unit 201 receives the transport stream TS on the broadcast wave transmitted from the broadcast transmission system 100. The transport stream TS includes the video stream, the audio stream, and the subtitle stream, as described above. The TS analysis unit 202 extracts the PES packet of each of the video, audio, and subtitle streams, from the transport stream TS.

In this case, the TS analysis unit 202 analyzes various types of information inserted into the header of each TS packet, selectively extracts the TS packet including data of video, audio, and subtitle PES packets on the basis of "PID", to obtain the video, audio, and subtitle PES packets.

In addition, the TS analysis unit 202 analyzes various types of information inserted into the header of each TS packet, extracts various types of information inserted into the transport stream TS on the basis of the "PID", and transmits the information to the CPU 221. The information also includes the TTML display descriptor (TTML_display_descriptor) (see FIG. 22), the font download descriptor (Font_download_descriptor) (see FIG. 23), and the URL signaling descriptor (URL_signaling_descriptor) (see FIG. 24).

The CPU 221 acquires, from the TTML display descriptor, the information regarding the resizing processing ("scaling_justify_flag") and the information for determining the subtitle display range ("display_aspect_type", "reference_point_offset_v, reference_point_offset_h") as the auxiliary information to be used when the subtitle is displayed by using the subtitle display position information of the TTML included in the subtitle stream.

In addition, the CPU 221 acquires, from the font download descriptor, the information ("font_file_id", "ISO_639_language_code", "font_group_id", "font_name_id", and the like) for downloading, from the broadcast signal (transport stream TS), the file of the font specified by the font specification information included in the TTML included in the subtitle stream.

In addition, the CPU 221 acquires, from the URL signaling descriptor, the information ("ISO_639_language_code", "font_group_id", "font_name_id", "url_type", "URL", and the like) for downloading, from the server on the network, the file of the font specified by the font specification information included in the TTML included in the subtitle stream.

In addition, the information extracted by the TS analysis unit 202 also includes the FDT (Font_downloading_section table) (see FIG. 27) in the case of downloading, from the broadcast signal (transport stream TS), the file of the font specified by the font specification information included in the TTML included in the subtitle stream. The CPU 221 acquires, from the FDT, the file of the font specified by the font specification information included in the TTML included in the subtitle stream.

The audio decoder 207 performs decoding processing on the audio PES packet obtained by the TS analysis unit 202, to obtain audio data. The audio output circuit 208 performs, on the audio data, necessary processing such as D/A conversion or amplification, and supplies the data to the speaker 209. The video decoder 203 performs decoding processing on the video PES packet obtained by the TS analysis unit 202 to obtain video data. Note that, the video decoder 203 also performs resolution conversion of the video data as appropriate depending on a display mode or the like. For example, in a case where the aspect ratio of the video area is 16:9 and the aspect ratio of the monitor (display) is 4:3, and the display mode is Letter box, the resolution conversion of the video data is performed.

The subtitle decoder 210 performs decoding processing on the subtitle PES packet obtained by the TS analysis unit 202 to obtain the TTML from the timed text subtitling segments (TimedText subtitle segments), and transmits the TTML to the CPU 221. The CPU 221 acquires, from the TTML, the subtitle display position information for specifying the subtitle display position (region) as the relative position (proportional value) with respect to the subtitle display range, and further the information regarding the resizing processing ("dto:scalingjustify") and the information for determining the subtitle display range ("dto:dispasp", "dto:RPoffset") as the auxiliary information to be used when the subtitle is displayed by using the subtitle display position information, and the like.

In addition, the subtitle decoder 210 extracts the TTML display segment (TTML_display_segment) (see FIG. 16), the font download segment (Font_download_segment) (see FIG. 18), and the URL signaling segment (URL_signalin_segment) (see FIG. 20) included in the subtitle PES packet obtained by the TS analysis unit 202, and transmits them to the CPU 221.

The CPU 221 acquires, from the TTML_display_segment, the information regarding the resizing processing ("scaling_justify_flag") and the information for determining the subtitle display range ("display_aspect_type", "reference_point_offset_v, reference_point_offset_h") as the auxiliary information to be used when the subtitle is displayed by using the subtitle display position information of the TTML included in the subtitle stream.

In addition, the CPU 221 acquires, from the font download segment, the information ("font_file_id", "ISO_639_language_code", "font_group_id", "font_name_id", and the like) for downloading, from the broadcast signal (transport stream TS), the file of the font specified by the font specification information included in the TTML included in the subtitle stream.

In addition, the CPU 221 acquires, from the URL signaling segment, the information ("ISO_639_language_code", "font_group_id", "font_name_id", "url_type", "URL", and the like) for downloading, from the server on the network, the file of the font specified by the font specification information included in the TTML included in the subtitle stream.

In addition, under the control of the CPU 221, the subtitle decoder 210 converts the text data (font data) of the subtitle of each subtitle display position (region) included in the TTML into bitmap data (binary image information). In this case, under the control of the CPU 221, the font size of the subtitle is appropriately adjusted from the font size specified in the TTML depending on the size of the subtitle display position determined by subtitle display position information or obtained by being subjected to further resizing processing.

The CPU 221 determines the subtitle display position on the basis of the subtitle display position information, and further performs resizing processing on the subtitle display position determined, as necessary. At this time, the CPU 221 appropriately uses the auxiliary information (information regarding the resizing processing, information for determining the subtitle display range) inserted into the TTML, the PES packet, the PMT, or the like as described above. Details will be described later of a procedure of determination and resizing processing of the subtitle display position in the CPU 221.

In addition, under the control of the CPU 221, the subtitle decoder 210 uses the file of the font specified by the font specification information included in the TTML when obtaining the bitmap data of the subtitle.

When the television receiver 200 does not mount the file of the font specified by the font specification information, the CPU 221 appropriately downloads and uses the font file from the broadcast signal (transport stream TS) or the server on the network on the basis of the download information inserted into the PES packet, the PMT, or the like as described above. Note that, when the file cannot be downloaded, a substitute font file (for example, a default font file) is used. Details will be further described later of a procedure of determination processing of the font file to be used in the CPU 221.

Under the control of the CPU 221, the video superimposition unit 204 superimposes the bitmap data of the subtitle at each subtitle display position obtained by the subtitle decoder 210 on the video data obtained by the video decoder 203, to obtain the video data for display. In this case, the CPU 221 performs control so that the superimposed position of the subtitle bitmap data becomes the subtitle display position, on the basis of the subtitle display position determined by the subtitle display position information or obtained by being subjected to further resizing processing as described above.

The panel drive circuit 205 drives the display panel 206 on the basis of the video data for display obtained by the video superimposition unit 204. The display panel 206 is configured by, for example, a Liquid Crystal Display (LCD), an organic electroluminescence (EL) display, and the like.

Operation of the television receiver 200 illustrated in FIG. 35 is briefly described. In the reception unit 201, the transport stream TS is received loaded on the broadcast wave and transmitted from the broadcast transmission system 100. The transport stream TS includes the video stream, the audio stream, and the subtitle stream. The transport stream TS is supplied to the TS analysis unit 202. The TS analysis unit 202 extracts the PES packet of each of the video, audio, and subtitle streams, from the transport stream TS.

In addition, the TS analysis unit 202 extracts various types of information inserted into the transport stream TS, and transmits the information to the CPU 221. The information also includes the TTML display descriptor), the font download descriptor, and the URL signaling descriptor.

Thus, the CPU 221 acquires the auxiliary information (information regarding the sizing processing, information for determining the subtitle display range to be used when the subtitle is displayed by using the subtitle display position information of the TTML included in the subtitle stream. In addition, the CPU 221 acquires the download information for downloading the file of the font specified by the font specification information included in the TTML included in the subtitle stream from the broadcast signal (transport stream TS) or the server on the network.

In addition, when downloading the file of the font specified by the font specification information included in the TTML included in the subtitle stream from the broadcast signal (transport stream TS), the TS analysis unit 202 extracts the FDT from the transport stream TS and transmits the FDT to the CPU 221. Thus, the CPU 221 acquires the file of the font specified by the font specification information included in the TTML included in the subtitle stream.

The video PES packet extracted by the TS analysis unit 202 is supplied to the video decoder 203. The video decoder 203 performs decoding processing on the video PES packet to obtain the video data. In this case, the video decoder 203 also performs resolution conversion of the video data as appropriate depending on the display mode or the like.

In addition, the subtitle PES packet extracted by the TS analysis unit 202 is supplied to the subtitle decoder 210. The subtitle decoder 210 performs decoding processing on the subtitle PES packet obtained by the TS analysis unit 202 to obtain the TTML. The TTML is transmitted to the CPU 221. From the TTML, the CPU 221 acquires the subtitle display position information for specifying the subtitle display position (region) as the relative position (proportional value) with respect to the subtitle display range, and further the auxiliary information (information regarding the resizing processing, information for determining the subtitle display range) to be used when the subtitle is displayed by using the subtitle display position information, and the like.

In addition, the subtitle decoder 210 extracts the TTML display segment, the font download segment, and the URL signaling segment from the subtitle PES packet obtained by the TS analysis unit 202, and transmits the segments to the CPU 221.

Thus, the CPU 221 acquires the auxiliary information (information regarding the sizing processing, information for determining the subtitle display range to be used when the subtitle is displayed by using the subtitle display position information of the TTML included in the subtitle stream. In addition, the CPU 221 acquires the download information for downloading the file of the font specified by the font specification information included in the TTML included in the subtitle stream from the broadcast signal (transport stream TS) or the server on the network.

Under the control of the CPU 221, the subtitle decoder 210 converts the text data (font data) of the subtitle of each subtitle display position (region) included in the TTML into the bitmap data (binary image information). In this case, under the control of the CPU 221, the font size of the subtitle is appropriately adjusted from the font size specified in the TTML depending on the size of the subtitle display position determined by subtitle display position information or obtained by being subjected to further resizing processing.

In addition, in this case, when the bitmap data of the subtitle is obtained, basically, the file is used of the font specified by the font specification information included in the TTML. When the television receiver 200 does not mount the file of the font specified by the font specification information, the font file is downloaded and used from the broadcast signal (transport stream TS) or the server on the network on the basis of the download information inserted into the PES packet, the PMT, or the like. At this time, when the font file cannot be downloaded, a substitute font file is used.

The CPU 221 determines the subtitle display position on the basis of the subtitle display position information, and further performs resizing processing on the subtitle display position determined, as necessary. At this time, the CPU 221 appropriately uses the auxiliary information (information regarding the resizing processing, information for determining the subtitle display range) inserted into the TTML, the PES packet, the PMT, or the like as described above.

The bitmap data of each subtitle display position output from the subtitle decoder 210 is supplied to the video superimposition unit 204. The video superimposition unit 204 superimposes the bitmap data of the subtitle at each subtitle display position obtained by the subtitle decoder 210 on the video data obtained by the video decoder 203, to obtain the video data for display. In this case, the CPU 221 performs control so that the superimposed position of the subtitle bitmap data becomes the subtitle display position, on the basis of the subtitle display position determined by the subtitle display position information or obtained by being subjected to further resizing processing.

The video data for display obtained by the video superimposition unit 204 is supplied to the panel drive circuit 205. In the panel drive circuit 205, the display panel 206 is driven on the basis of the video data for display. Thus, the display panel 206 displays an image in which the subtitle is superimposed on each subtitle display position (region).

In addition, the audio PES packet extracted by the TS analysis unit 202 is supplied to the audio decoder 207. The audio decoder 207 performs decoding processing on the audio PES packet to obtain audio data. The audio data is supplied to the audio output circuit 208. The audio output circuit 208 performs, on the audio data, necessary processing such as D/A conversion or amplification. Then, the audio data after the processing is supplied to the speaker 209. Thus, audio output corresponding to the display image on the display panel 206 is obtained from the speaker 209.

"Procedure of Determination and Resizing Processing of Subtitle Display Position"

Figure 36:
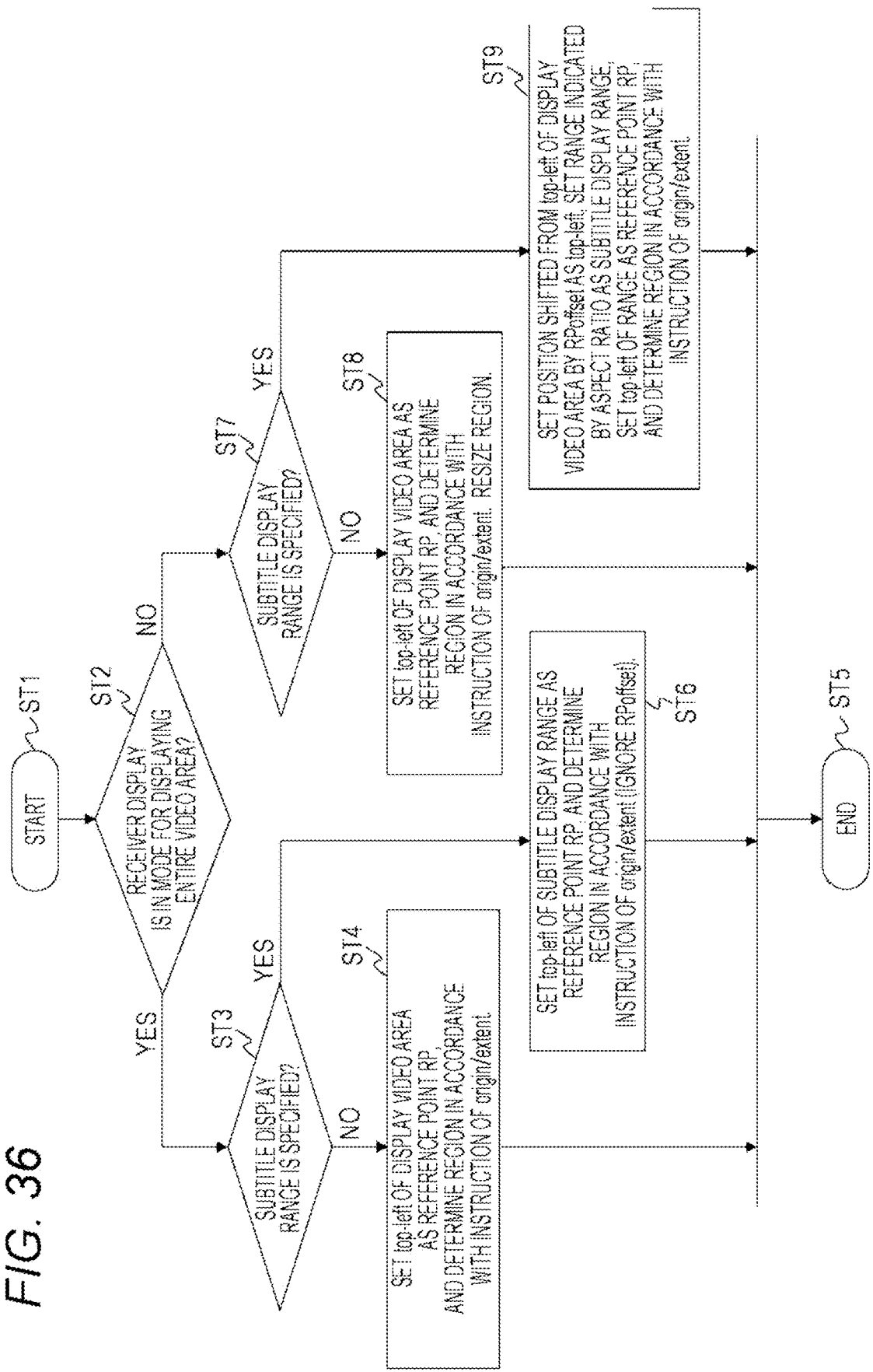
FIG. 36 is a flowchart illustrating an example of a procedure of determination and resizing processing of the subtitle display position in a CPU of the television receiver.

The details will be described of the procedure of determination and resizing processing of the subtitle display position in the CPU 221. The flowchart of FIG. 36 illustrates an example of the procedure of determination and resizing processing of the subtitle display position in the CPU 221.

Figure 37:
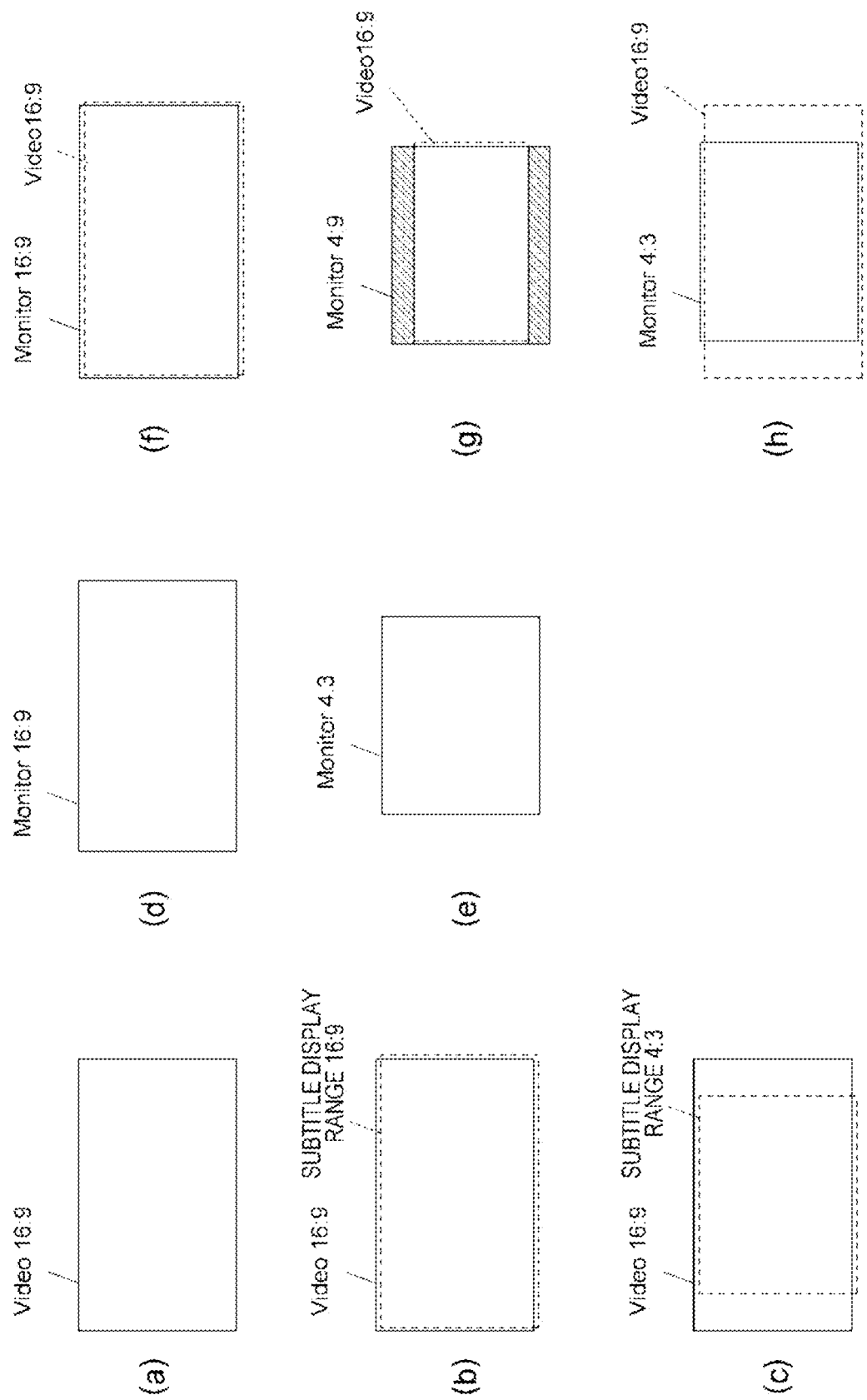
FIG. 37 is a diagram of an example of the aspect ratio of the video area and an aspect ratio of a monitor (display), and for explaining an example of determining whether or not a mode is for displaying the entire video area.

In the example, it is assumed that the aspect ratio of the video area is 16:9. Then, it is assumed that there are both cases where the subtitle display range is not specified in the TTML as illustrated in FIG. 37(a), and where the subtitle display range is specified in the TTML as illustrated in FIGS. 37(b) and 37(c). Note that, here, an example is illustrated in which the aspect ratio of the specified subtitle display range is 16:9 and 4:3; however, the aspect ratio of the specified subtitle display range is not limited thereto. In addition, here, it is assumed that there are both cases where the aspect ratio of the monitor (display) is 16:9, and where the aspect ratio is 4:3.

The CPU 221 starts processing in step ST1, and then proceeds to processing in step ST2. In step ST2, the CPU 221 determines whether or not the receiver display is in a mode for displaying the entire video area. For example, in a case where the aspect ratio of the monitor is 16:9 (see FIG. 37(f)) or in a case where the aspect ratio of the monitor is 4:3 and the display method of Letter box is adopted (see FIG. 37(g)), it is determined that the display is in the mode for displaying the entire video area. Further, for example, in a case where the aspect ratio of the monitor is 4:3 and the display method of Center-cut is adopted (see FIG. 37(h)), it is determined that the display is in a mode for not displaying the entire video area.

When determining that the display is in the mode for displaying the entire video area, the CPU 221 proceeds to processing in step ST3. In step ST3, the CPU 221 determines whether or not the subtitle display range is specified. For example, in a case where reference point information (RPoffset) and aspect ratio information (dispasp) of the subtitle display range exist in the tt root container of the TTML, it is determined that the subtitle display range is specified.

When the subtitle display range is not specified, the CPU 221 proceeds to processing in step ST4. In step ST4, the CPU 221 sets the display video area as the subtitle display range, and determines the subtitle display position (region). At this time, the CPU 221 sets the top-left of the display video area as a reference point RP, and determines the subtitle display position (region) in accordance with an instruction of the subtitle display position information ("origin="OH % OV %"", "extent="EH % EV %"") specified as the relative position with respect to the subtitle display range.

Figure 38:
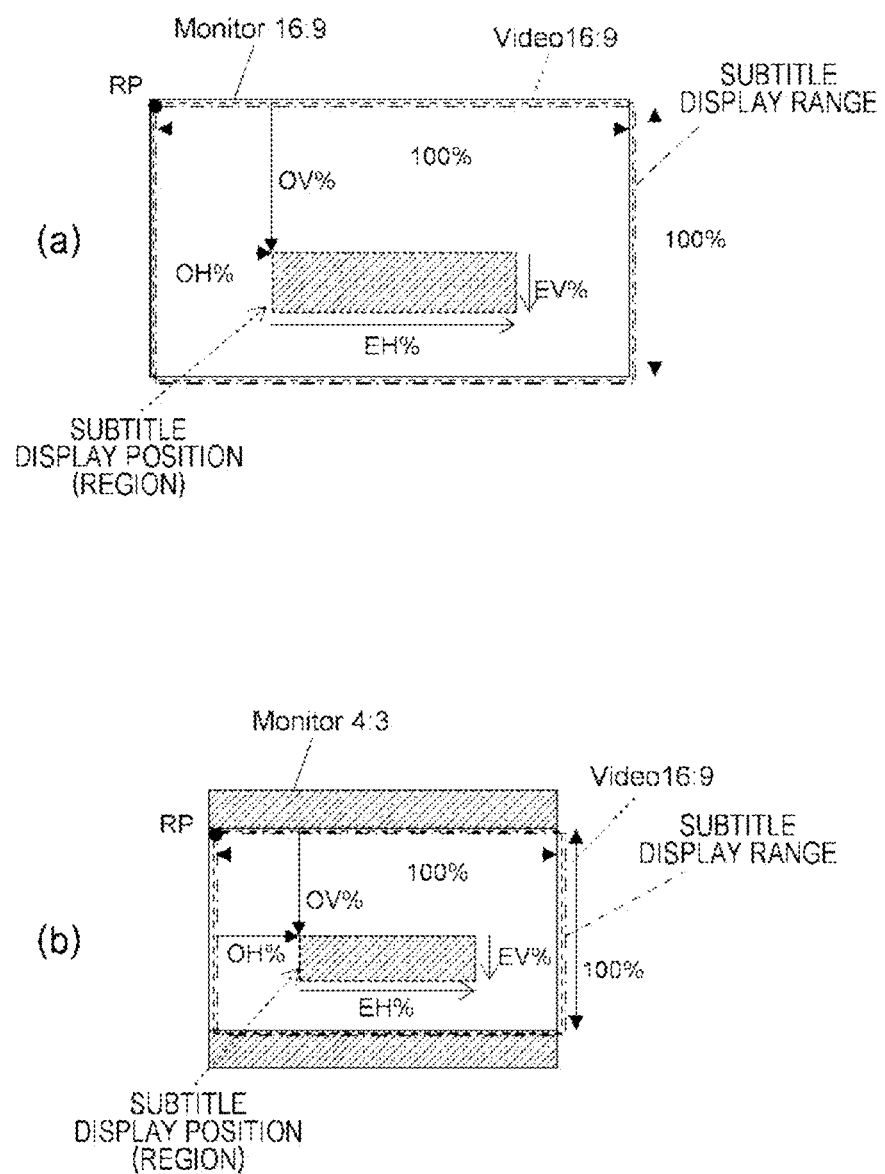
FIG. 38 is a diagram for explaining determination of the subtitle display position in the mode for displaying the entire video area, and in a case where the subtitle display range is not specified.

FIG. 38(a) illustrates an example in a case where the aspect ratio of the monitor is 16:9. FIG. 38(b) illustrates an example in a case where the aspect ratio of the monitor is 4:3 and the display method of Letter box is adopted. Note that, "RP" indicates the reference point (Reference Pont) that is the top-left of the subtitle display range.

After the processing in step ST4, the CPU 221 ends the processing, in step ST5.

When the subtitle display range is specified in step ST3 described above, the CPU 221 proceeds to processing in step ST6. In step ST6, the CPU 221 determines the subtitle display position (region) in the subtitle display range specified. At this time, the CPU 221 uses only the aspect ratio information (dispasp) as the information on the subtitle display range, and sets the subtitle display range on the display video area. Then, the CPU 221 sets the top-left of the subtitle display range as the reference point RP, and determines the subtitle display position (region) in accordance with the instruction of the subtitle display position information ("origin="OH % OV %"", "extent="EH % EV %"") specified as the relative position with respect to the subtitle display range.

Figure 39:
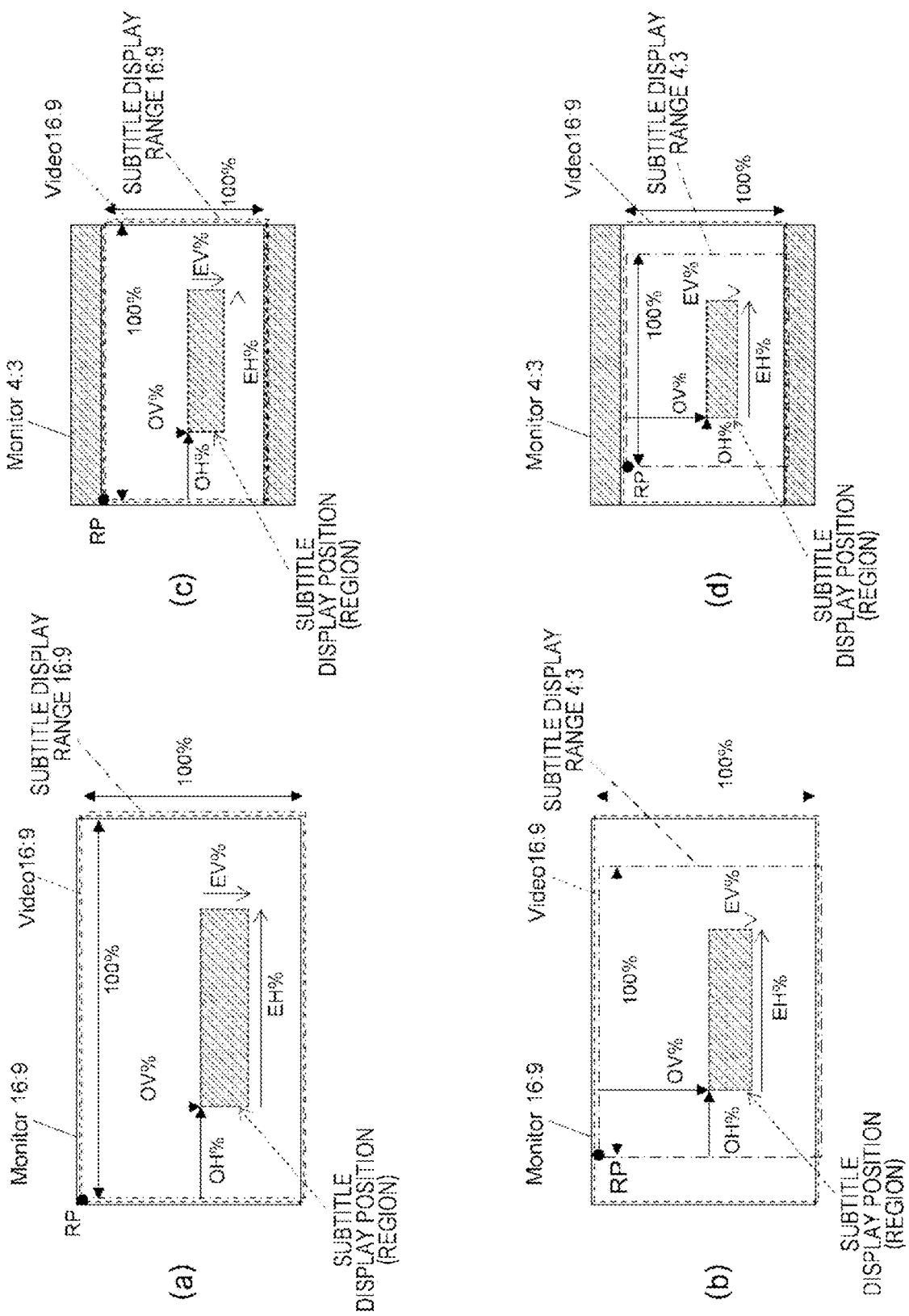
FIG. 39 is a diagram for explaining determination of the subtitle display position in the mode for displaying the entire video area, and in a case where the subtitle display range is specified.

FIG. 39(a) illustrates an example in a case where the aspect ratio of the monitor is 16:9 and the aspect ratio indicated by the aspect ratio information (dispasp) is 16:9. FIG. 39(b) illustrates an example in a case where the aspect ratio of the monitor is 16:9 and the aspect ratio indicated by the aspect ratio information (dispasp) is 4:3.

Note that, in a case where the aspect ratio indicated by the aspect ratio information (dispasp) is different from the aspect ratio of the monitor as described above, the CPU 221 sets, at the center of the display video area, the subtitle display range whose vertical direction width or horizontal direction width coincides and that has the aspect ratio indicated by the aspect ratio information (dispasp). In the illustrated example, since the aspect ratio of the monitor is 16:9 and the aspect ratio information (dispasp) is 4:3, the vertical direction widths coincide with each other.

FIG. 39(c) illustrates an example in a case where the aspect ratio of the monitor is 4:3 and the display method of Letter box is adopted, and the aspect ratio indicated by the aspect ratio information (dispasp) is 16:9. FIG. 39(d) illustrates an example in a case where the aspect ratio of the monitor is 4:3 and the display method of Letter box is adopted, and the aspect ratio indicated by the aspect ratio information (dispasp) is 4:3.

After the processing in step ST6, the CPU 221 ends the processing, in step ST5.

When it is determined that the display is in the mode for not displaying the entire video area in step ST2 described above, the processing proceeds to step ST7. In step ST7, the CPU 221 determines whether or not the subtitle display range is specified. For example, in a case where reference point information (RPoffset) and aspect ratio information (dispasp) of the subtitle display range exist in the tt root container of the TTML, it is determined that the subtitle display range is specified.

When the subtitle display range is not specified, the CPU 221 proceeds to processing in step ST8. In step ST8, the CPU 221 sets the display video area as the subtitle display range, and determines the subtitle display position (region). At this time, the CPU 221 sets the top-left of the display video area as a reference point RP, and determines the subtitle display position (region) in accordance with an instruction of the subtitle display position information ("origin="OH % OV %"", "extent="EH % EV %"") specified as the relative position with respect to the subtitle display range.

In the subtitle display position thus determined, the width is compressed only in the horizontal direction. For that reason, the CPU 221 further performs resizing processing on the subtitle display position determined, to compress also the width in the vertical direction, and obtains the final subtitle display position. In this case, the CPU 221 compresses the width in the vertical direction in a state where the predetermined line position is fixed on the basis of the information of the "dto:scalingjustify=top" included in the TTML, for example.

Figure 40:
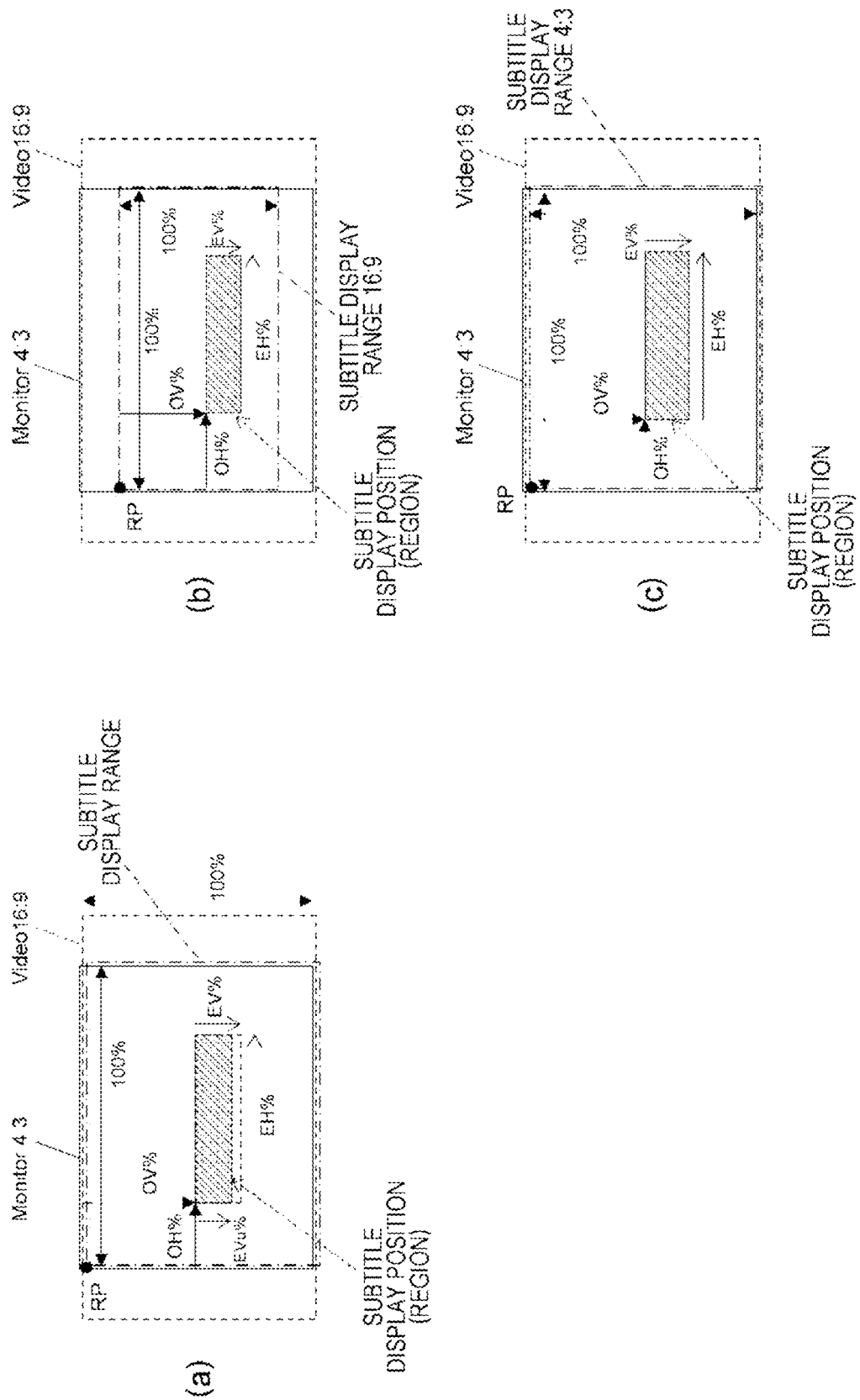
FIG. 40 is a diagram for explaining determination of the subtitle display position in a mode for not displaying the entire video area, and in a case where the subtitle display range is not specified and in a case where the subtitle display range is specified.

FIG. 40(a) illustrates an example in a case where the aspect ratio of the monitor is 4:3 and the display method of Center-cut is adopted. The width in the vertical direction of the subtitle display position is compressed from EV % to EVu % by the resizing processing.

After the processing in step ST8, the CPU 221 ends the processing, in step ST5.

When the subtitle display range is specified in step ST7 described above, the CPU 221 proceeds to processing in step ST9. In step ST9, the CPU 221 determines the subtitle display position (region) in the subtitle display range specified. At this time, the CPU 221 uses the information on the subtitle display range (reference point information (RPoffset), aspect ratio information (dispasp)) to set the subtitle display range on the display video area.

In this case, the CPU 221 sets, as the top-left of the subtitle display range, a position shifted from the top-left of the display video area by the reference point information (RPoffset), and sets a range corresponding to the aspect ratio indicated by the aspect ratio information (dispasp) in the subtitle display range. In this case, the horizontal direction width of the subtitle display range coincides with the horizontal direction width of the display video area.

Then, the CPU 221 sets, as the reference point RP, the top-left of the subtitle display range set as described above, and determines the subtitle display position (region) in accordance with the instruction of the subtitle display position information ("origin="OH % OV %"", "extent="EH % EV %"") specified as the relative position with respect to the subtitle display range.

FIG. 40(b) illustrates an example in a case where the aspect ratio of the monitor is 4:3 and the display method of Center-cut is adopted, and the aspect ratio indicated by the aspect ratio information (dispasp) is 16:9. FIG. 40(c) illustrates an example in a case where the aspect ratio of the monitor is 4:3 and the display method of Center-cut is adopted, and the aspect ratio indicated by the aspect ratio information (dispasp) is 4:3.

After the processing in step ST9, the CPU 221 ends the processing, in step ST5.

"Procedure of Determination Processing of Font File to be Used"

Figure 41:
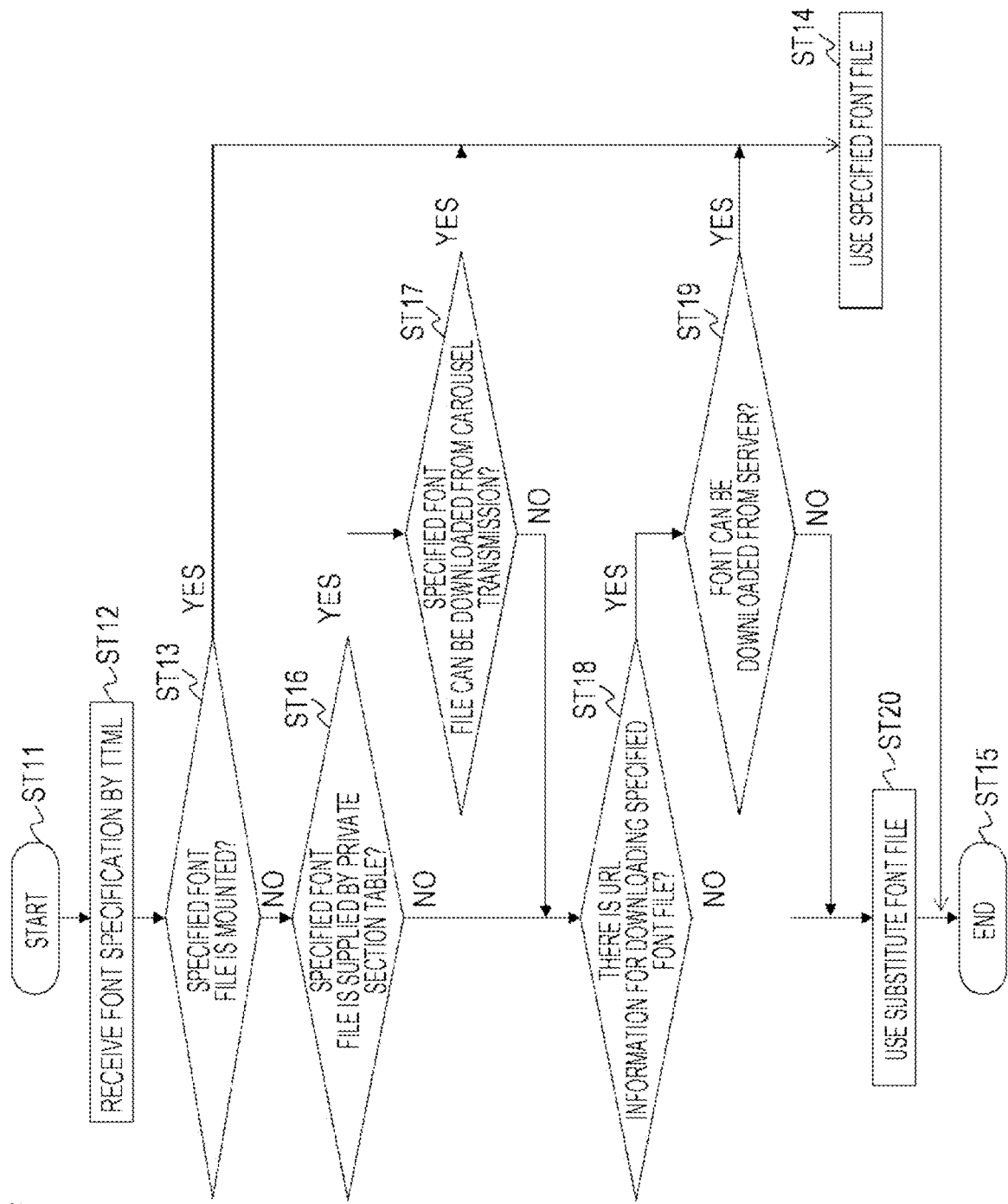
FIG. 41 is a flowchart illustrating an example of a procedure of determination processing of a font file to be used in the CPU of the television receiver.

The details will be described of the procedure of determination processing of the font file to be used in the CPU 221. The flowchart of FIG. 41 illustrates an example of the procedure of determination processing of the font file to be used in the CPU 221.

The CPU 221 starts processing in step ST11, and then proceeds to processing in step ST12. In step ST12, the CPU 221 receives the font specification in the TTML. That is, the CPU 221 receives the TTML including the font specification information from the subtitle decoder 210.

Next, in step ST13, the CPU 221 determines whether or not the television receiver 200 mounts a specified font file, a font file specified by the font specification information of the TTML. When determining that the specified font file is mounted, the CPU 221 determines to use the specified font file mounted in step ST14, and then ends the processing in step ST15.

When determining that the specified font file is not mounted in step ST13, the CPU 221 determines whether or not the specified font fill is supplied in the private section table, that is, the FDT (Font_downloading_section table) in step ST16. In this case, in a case where the font download segment (Font_download_segment) (see FIG. 18) or the font download descriptor (Font_download_descriptor) (see FIG. 23) includes the download information of the specified font file, the CPU 221 determines that the specified font file is supplied in the FDT.

When determining that the specified font file is supplied in the FDT, in step ST17, the CPU 221 determines whether or not the specified font file can be downloaded from the carousel transmission. When the specified font file can be downloaded, the CPU 221 determines to use the specified font file downloaded in step ST14, and then ends the processing in step ST15.

When the specified font file cannot be downloaded in step ST17, the CPU 221 proceeds to processing in step ST18. When determining that the specified font file is not supplied in the FDT in step ST16, the CPU 221 also proceeds to the processing in step ST18.

In step ST18, the CPU 221 determines whether or not there is URL information for downloading the specified font file. In this case, in a case where the URL signaling segment (URL_signalin_segment) (see FIG. 20) or the URL signaling descriptor (URL_signaling_descriptor) (see FIG. 24) includes the URL information for downloading the specified font file, the CPU 221 determines that there is the URL information for downloading the specified font file.

When determining that there is the URL information for downloading the specified font file, in step ST19, the CPU 221 determines whether or not the specified font file can be downloaded from the server on the network. When the specified font file can be downloaded, the CPU 221 determines to use the specified font file downloaded in step ST14, and then ends the processing in step ST15.

When the specified font file cannot be downloaded in step ST19, the CPU 221 proceeds to processing in step ST20. When determining that there is no URL information for downloading the specified font file in step ST18, the CPU 221 also proceeds to the processing in step ST20.

In step ST20, the CPU 221 determines not to use the specified font file but to use a substitute font file, for example, a file of a font set as default, and then ends the processing in step ST15.

As described above, in the transmission/reception system 10 illustrated in FIG. 1, the broadcast transmission system 100 inserts, into the subtitle stream container (for example, PES packet, PMT), the auxiliary information (information regarding the resizing processing, information for determining the subtitle display range) to be used when the subtitle is displayed by using the subtitle position information. For that reason, in the reception side, by using the auxiliary information together with the subtitle position information, it becomes possible to appropriately acquire the subtitle display position and satisfactorily perform subtitle display.

In addition, in the transmission/reception system 10 illustrated in FIG. 1, the television receiver 200 performs the display position control on the bitmap data of the subtitle on the basis of the subtitle display position acquired by using the subtitle display position information and the auxiliary information. For that reason, it becomes possible to satisfactorily perform subtitle display.

In addition, in the transmission/reception system 10 illustrated in FIG. 1, the broadcast transmission system 100 inserts, into the container of the subtitle stream (for example, PES packet, PMT), the download information for downloading the file of the font specified by at least the font specification information of the TTML. For that reason, in the reception side, in a case where the file of the font specified by the font specification information is not included, it becomes possible to acquire the file of the font specified by the font specification information on the basis of the download information, and to satisfactorily perform subtitle display.

In addition, in the transmission/reception system 10 illustrated in FIG. 1, the television receiver 200 acquires the font file of the font specified by the font specification information on the basis of the download information, and uses the font file when obtaining the bitmap data of the subtitle. For that reason, even in a case where the file of the font specified by the font specification information is not included, it becomes possible to satisfactorily perform subtitle display.

2. Modifications

In the above embodiment, an example has been described in which font download information is not inserted into TTML (see FIGS. 3 and 5). However, it is conceivable to insert the font download information into the TTML. FIG. 42 illustrates an example of a TTML structure in that case. The example is a case where there are two subtitle display positions (regions) similarly to the case in FIG. 5.

Each piece of information of the "fontdlurl=http://www.w3.org/ns/fontdlservice", "fontdlurl:iso639languagecode="value"", ""fontdlurl:fontgroupid="value"", "fontdlurl:fontnameid="value"", and "fontdlurl:fontname="value"" constitutes download information. Note that, specifications of 'Arial' and 'Tahoma' are reflected as they are in the "value" of the "fontdlurl:fontname".

In addition, in the above-described embodiment, an example has been described in which the TTML is used as the text information of the subtitle of a predetermined format. However, the present technology is not limited thereto, and it is also conceivable to use another text information including information equivalent to the TTML. For example, a derived format of the TTML may be used.

In addition, in the above embodiment, the transmission/reception system 10 configured by the broadcast transmission system 100 and the television receiver 200 has been described; however, the configuration of the transmission/reception system to which the present technology can be applied is not limited thereto. For example, the television receiver 200 may have a configuration of a set top box and a monitor connected together via a digital interface such as High-Definition Multimedia Interface (HDMI). Incidentally, "HDMI" is a registered trademark.

In addition, in the above-described embodiment, an example has been described in which the container is the transport stream of MPEG-2 TS. Needless to say, the present technology can be similarly applied to a case where the container is a transport stream of MMT, a DASH/ISOBMFF stream, or the like.

In addition, the present technology may also be embodied in the configurations described below.

(1) A transmission device including:
a transmission unit that transmits a container of a predetermined format, the container including a video stream including video data and a subtitle stream including text information of a subtitle, the text information including subtitle display position information for specifying a subtitle display position as a relative position with respect to a subtitle display range; and
an information insertion unit that inserts, into a container of the subtitle stream, auxiliary information to be used when the subtitle is displayed by using the subtitle position information.

(2) The transmission device according to (1), in which
the auxiliary information includes
information regarding resizing processing of the subtitle display position determined on the basis of the subtitle display position information, the resizing processing being performed in the reception side in a case where an aspect ratio of a video area is different from an aspect ratio of a display video area.

(3) The transmission device according to (2), in which
the information regarding the resizing processing is information indicating a line position to be set as a fixed position in a case where a size in a vertical direction is compressed in the resizing processing of the subtitle display position.

(4) The transmission device according to any of (1) to (3), in which
the auxiliary information includes
information for determining the subtitle display range.

(5) The transmission device according to (4), in which
the information for determining the subtitle display range is reference point information and aspect ratio information of the subtitle display range.

(6) The transmission device according to any of (1) to (5), in which
the information insertion unit
inserts the auxiliary information into a PES packet and/or a program map table.

(7) A transmission method including:
a transmission step, by a transmission unit, of transmitting a container of a predetermined format, the container including a video stream including video data and a subtitle stream including text information of a subtitle, the text information including subtitle display position information for specifying a subtitle display position as a relative position with respect to a subtitle display range; and
an information insertion step of inserting, into a container of the subtitle stream, auxiliary information to be used when the subtitle is displayed by using the subtitle position information.

(8) The reception device including:
a reception unit that receives a container of a predetermined format, the container including a video stream including video data and a subtitle stream including text information of a subtitle, the text information including subtitle display position information for specifying a subtitle display position as a relative position with respect to a subtitle display range;
a video decoding unit that performs decoding processing on the video stream to obtain the video data; and
a subtitle decoding unit that performs decoding processing on the subtitle stream to obtain bitmap data of the subtitle, in which
auxiliary information to be used when the subtitle is displayed by using the subtitle position information is inserted into a container of the subtitle stream, and the reception device further includes:
a display control unit that performs display position control on the bitmap data of the subtitle on the basis of the subtitle display position acquired by using the subtitle display position information and the auxiliary information; and
a video superimposition unit that superimposes the bitmap data of the subtitle subjected to the display position control on the video data.

(9) The reception device according to (8), in which
the auxiliary information includes information regarding resizing processing of the subtitle display position determined on the basis of the subtitle display position information, the resizing processing being performed in the reception side in a case where an aspect ratio of a video area is different from an aspect ratio of a display video area, and
the display control unit,
in the case where the aspect ratio of the video area is different from the aspect ratio of the display video area, sets the display video area as the subtitle display range and determines the subtitle display position on the basis of the subtitle display position information, performs the resizing processing by using the information regarding the resizing processing on the subtitle display position determined, and performs the display position control on the bitmap data of the subtitle on the basis of the subtitle display position subjected to the resizing processing.

(10) The reception device according to (8), in which
the auxiliary information includes information for determining the subtitle display range, and
the display control unit,
in the case where the aspect ratio of the video area is different from the aspect ratio of the display video area, sets the subtitle display range in the display video area on the basis of the information for determining the subtitle display range, determines the subtitle display position on the basis of the subtitle display position information, and performs the display position control on the bitmap data of the subtitle on the basis of the subtitle display position determined.

(11) A reception method including:
a reception step, by a reception unit, of receiving a container of a predetermined format, the container including a video stream including video data and a subtitle stream including text information of a subtitle, the text information including subtitle display position information for specifying a subtitle display position as a relative position with respect to a subtitle display range;
a video decoding step of performing decoding processing on the video stream to obtain the video data; and
a subtitle decoding step of performing decoding processing on the subtitle stream to obtain bitmap data of the subtitle, in which
auxiliary information to be used when the subtitle is displayed by using the subtitle position information is inserted into a container of the subtitle stream, and
the reception method further includes:
a display control step of performing display position control on the bitmap data of the subtitle on the basis of the subtitle display position acquired by using the subtitle display position information and the auxiliary information; and
a video superimposition step of superimposing the bitmap data of the subtitle subjected to the display position control on the video data.

(12) A transmission device including:
a transmission unit that transmits a container of a predetermined format, the container including a video stream including video data and a subtitle stream including text information of a subtitle, the text information including font specification information; and
an information insertion unit that inserts download information for downloading a file of a font specified by at least the font specification information into a container of the subtitle stream.

(13) The transmission device according to (12), in which
the download information is information for acquiring a file of the font from a broadcast signal.

(14) The transmission device according to (12) or (13), in which
the download information is information for acquiring a file of the font from a server on a network.

(15) The transmission device according to any of (12) to (14), in which
the information insertion unit
inserts the download information into a PES packet and/or a program map table.

(16) A transmission method including:
a transmission step, by a transmission unit, of transmitting a container of a predetermined format, the container including a video stream including video data and a subtitle stream including text information of a subtitle, the text information including font specification information; and
an information insertion step of inserting download information for downloading a file of a font specified by at least the font specification information into a container of the subtitle stream.

(17) A reception device including:
a reception unit that receives a container of a predetermined format, the container including a video stream including video data and a subtitle stream including text information of a subtitle, the text information including font specification information; and
a video decoding unit that performs decoding processing on the video stream to obtain the video data, in which
download information is inserted for downloading a file of a font specified by at least the font specification information into a container of the subtitle stream, and
the reception unit further includes:
a font file downloading unit that acquires a font file of the font specified by the font specification information on the basis of the download information;
a subtitle decoding unit that performs decoding processing on the subtitle stream and obtains bitmap data of the subtitle on the basis of the font file acquired;
a display control unit that performs display position control on the bitmap data of the subtitle on the basis of a subtitle display position obtained by using the subtitle display position information; and
a video superimposition unit that superimposes the bitmap data of the subtitle subjected to the display position control on the video data.

(18) A reception method including:
a reception step, by a reception unit, of receiving a container of a predetermined format, the container including a video stream including video data and a subtitle stream including text information of a subtitle, the text information including font specification information; and
a video decoding step of decoding the video stream to obtain the video data, in which
download information is inserted for downloading a file of a font specified by at least the font specification information into a container of the subtitle stream, and the reception method further includes:

a font file downloading step of acquiring a font file of the font specified by the font specification information on the basis of the download information;

a subtitle decoding step of performing decoding processing on the subtitle stream and obtaining bitmap data of the subtitle on the basis of the font file acquired;

a display control step of performing display position control on the bitmap data of the subtitle on the basis of a subtitle display position obtained by using the subtitle display position information; and a video superimposition step of superimposing the bitmap data of the subtitle subjected to the display position control on the video data.

(19) A transmission device including:

a section table insertion unit that sequentially and repeatedly inserts a predetermined number of section tables respectively including different font files into a transport stream; and a transmission unit that transmits the transport stream into which the section tables are inserted.

(20) A transmission method including:

a section table insertion step of sequentially and repeatedly inserting a predetermined number of section tables respectively including different font files into a transport stream; and a transmission step, by a transmission unit, of transmitting the transport stream into which the section tables are inserted.

The main feature of the present technology is that, by inserting, into the container of the subtitle stream (for example, PES packet, PMT), the auxiliary information (information regarding the resizing processing, information for determining the subtitle display range) to be used when the subtitle is displayed by using the subtitle position information, in the reception side, it becomes possible to appropriately acquire the subtitle display position by using the auxiliary information together with the subtitle position information and to satisfactorily perform the subtitle display (see FIG. 34)

In addition, the main feature of the present technology is that, by inserting, into the container (for example, PES packet, PMT) of the subtitle stream, the download information for downloading the file of the font specified by at least the font specification information of the TTML, in a case where the file is not included of the file specified by the font specification information, it becomes possible to acquire the file of the font specified by the font specification information on the basis of the download information, and to satisfactorily perform the subtitle display (See FIG. 34).

REFERENCE SIGNS LIST

10 Transmission/reception system
100 Broadcast transmission system
110 Stream generation unit
111 Control unit
112 Video encoder
113 Audio encoder
114 Text format conversion unit
115 Subtitle encoder
116 TS formatter
200 Television receiver
201 Reception unit
202 TS analysis unit
203 Video decoder
204 Video superimposition unit
205 Panel drive circuit
206 Display panel
207 Audio decoder
208 Audio output circuit
209 Speaker
210 Subtitle decoder
221 CPU
227 Communication interface

The invention claimed is:

1. A transmission device comprising:
circuitry configured to:
transmit a container of a predetermined format, the container including a video stream including video data and a subtitle stream including text information of a subtitle, the text information including subtitle display position information for specifying a subtitle display position as a relative position with respect to a subtitle display range, wherein the subtitle display range is an area set in a display video area for displaying the subtitle, and the display video area is a video area displayed on a monitor on a reception side;
insert, into a container of the subtitle stream, auxiliary information to be used when the subtitle is displayed by using the subtitle position information, wherein the auxiliary information includes information for determining the subtitle display range;
sequentially and repeatedly insert a predetermined number of section tables respectively including different font files into a transport stream, wherein the section tables of the predetermined number of section tables include a font downloading section table that is defined as a private section table and includes a plurality of fields; and
transmit the transport stream into which the section tables are inserted.

2. The transmission device according to claim 1, wherein the auxiliary information includes information regarding resizing processing of the subtitle display position determined on the basis of the subtitle display position information, the resizing processing being performed in the reception side when an aspect ratio of the video area is different from an aspect ratio of the display video area.

3. The transmission device according to claim 2, wherein the information regarding the resizing processing is information indicating a line position to be set as a fixed position when a size in a vertical direction is compressed in the resizing processing of the subtitle display position.

4. The transmission device according to claim 1, wherein the auxiliary information includes information for determining the subtitle display range.

5. The transmission device according to claim 4, wherein the information for determining the subtitle display range is reference point information and aspect ratio information of the subtitle display range.

6. The transmission device according to claim 1, wherein the circuitry is further configured to insert the auxiliary information into a packetized elementary stream (PES) packet and/or a program map table.

7. The transmission device according to claim 1, wherein the text information includes font specification information, and the circuitry is further configured to insert download information for downloading a file of a font specified by at least the font specification information into a container of the subtitle stream.

8. The transmission device according to claim 7, wherein the download information is information for acquiring a file of the font from a broadcast signal.

9. The transmission device according to claim 7, wherein the download information is information for acquiring a file of the font from a server on a network.

10. The transmission device according to claim 7, wherein the circuitry is further configured to insert the download information into a packetized elementary stream (PES) packet and/or a program map table.

11. The transmission device according to claim 1, wherein the predetermined number of section tables includes a first section table including a font table and a plurality of second section tables each including one of the different font files.

12. The transmission device according to claim 1, wherein the plurality of fields include a data_downloading_id field, a section_number field, and a last_section_number field.

13. The transmission device according to claim 12, wherein the data_downloading_id field includes a plurality of values identifying each of the predetermined number of section tables, the section_number field includes a value of the plurality of values that identifies one of the predetermined number of section tables, and the last_section_number field includes a value of the plurality of values that identifies a last one of the predetermined number of section tables.

14. A reception device comprising:
circuitry configured to:
receive a container of a predetermined format, the container including a video stream including video data and a subtitle stream including text information of a subtitle, the text information including subtitle display position information for specifying a subtitle display position as a relative position with respect to a subtitle display range, wherein the subtitle display range is an area set in a display video area for displaying the subtitle, and the display video area is a video area displayed on a monitor, and wherein the video stream further includes a transport stream including a predetermined number of sequentially and repeatedly inserted section tables that respectively include different font files, wherein the section tables the predetermined number of section tables include a font downloading section table that is defined as a private section table and includes a plurality of fields; and
control processing of decoding the video stream to obtain the video data, processing of decoding the subtitle stream to obtain bitmap data of the subtitle, processing of performing display position control on the bitmap data of the subtitle on the basis of the subtitle display position acquired by using the subtitle display position information and auxiliary information to be used when the subtitle is displayed by using the subtitle position information inserted into a container of the subtitle stream, recognizing a positional relationship of the section tables to acquire the different font files of the section tables for the subtitle in one circulation, and processing of superimposing the bitmap data of the subtitle subjected to the display position control on the video data, wherein the auxiliary information is extracted from a container of the subtitle stream and includes information for determining the subtitle display range.

15. The reception device according to claim 14, wherein the auxiliary information includes information regarding resizing processing of the subtitle display position determined on the basis of the subtitle display position information, the resizing processing being performed in the reception side when an aspect ratio of a video area is different from an aspect ratio of a display video area, and
in the processing of performing the display position control, when the aspect ratio of the video area is different from the aspect ratio of the display video area, the display video area is set as the subtitle display range and the subtitle display position is determined on the basis of the subtitle display position information, the resizing processing is performed by using the information regarding the resizing processing on the subtitle display position determined, and the display position control is performed on the bitmap data of the subtitle on the basis of the subtitle display position subjected to the resizing processing.

16. The reception device according to claim 14, wherein the auxiliary information includes information for determining the subtitle display range, and
in the processing of performing the display position control, when the aspect ratio of the video area is different from the aspect ratio of the display video area, the subtitle display range is set in the display video area on the basis of the information for determining the subtitle display range, the subtitle display position is determined on the basis of the subtitle display position information, and the display position control is performed on the bitmap data of the subtitle on the basis of the subtitle display position determined.

17. The reception device according to claim 14, wherein the text information includes font specification information, and
the controller is further configured to control processing of acquiring a font file of a font specified by the font specification information on the basis of download information for downloading a file of the font specified by at least the font specification information inserted into the container of the subtitle stream, processing of decoding the subtitle stream and obtaining bitmap data of the subtitle on the basis of the font file acquired, and processing of superimposing the bitmap data of the subtitle on the video data.

* * * * *